(12) United States Patent
Jacobs, II et al.

(10) Patent No.: US 11,249,457 B2
(45) Date of Patent: Feb. 15, 2022

(54) METHODS AND SYSTEMS FOR MANUFACTURING A SUPPORT STRUCTURE

(71) Applicant: The Rapid Manufacturing Group LLC, Nashua, NH (US)

(72) Inventors: James L Jacobs, II, Amherst, NH (US); Emily Lingham, Ashland, MA (US)

(73) Assignee: PROTO LABS INC, Maple Plain, MN (US)

( * ) Notice: Subject to any disclaimer, the term of this patent is extended or adjusted under 35 U.S.C. 154(b) by 363 days.

(21) Appl. No.: 15/939,209

(22) Filed: Mar. 28, 2018

(65) Prior Publication Data

US 2018/0284726 A1 Oct. 4, 2018

Related U.S. Application Data

(60) Provisional application No. 62/479,758, filed on Mar. 31, 2017, provisional application No. 62/479,740, filed on Mar. 31, 2017.

(51) Int. Cl.
*G05B 19/4099* (2006.01)
*B33Y 50/02* (2015.01)
*B33Y 30/00* (2015.01)

(52) U.S. Cl.
CPC .......... *G05B 19/4099* (2013.01); *B33Y 50/02* (2014.12); *B33Y 30/00* (2014.12); *G05B 2219/35134* (2013.01); *G05B 2219/49007* (2013.01)

(58) Field of Classification Search
CPC ...... G05B 19/4099; B33Y 30/00; B33Y 50/02
See application file for complete search history.

(56) References Cited

U.S. PATENT DOCUMENTS

| | | | |
|---|---|---|---|
| 5,634,757 A | 6/1997 | Schanz | |
| 6,019,359 A | 2/2000 | Fly | |
| 6,152,436 A | 11/2000 | Sonderegger | |
| 6,224,467 B1 * | 5/2001 | Tanaka | B24B 13/005 451/388 |
| 6,367,791 B1 | 4/2002 | Calderon et al. | |
| 6,671,572 B1 * | 12/2003 | Craft | G05B 19/4097 29/33 P |
| 7,454,869 B2 | 11/2008 | Owen | |
| 7,901,166 B2 | 3/2011 | Halford | |

(Continued)

FOREIGN PATENT DOCUMENTS

WO 2015193103 12/2015

OTHER PUBLICATIONS

Tutorial45, Subtraction of objects in AutoCAD, 2016, https://web.archive.org/web/20160528233220/https://tutorial45.com/subtraction-of-objects-in-autocad/ (Year: 2016).*

(Continued)

*Primary Examiner* — Mark A Connolly
(74) *Attorney, Agent, or Firm* — Caldwell Intellectual Property Law, LLC

(57) ABSTRACT

A support structure includes a discrete object side and a recess in the discrete object side, the recess formed to mate with a fixture side of a workpiece. A method for manufacturing a support structure includes registering a discrete object model to a blank model and forming a recess in a discrete object side of the fixture blank model.

21 Claims, 14 Drawing Sheets

(56) References Cited

U.S. PATENT DOCUMENTS

| | | | |
|---|---|---|---|
| 8,434,208 B2 | 5/2013 | Jacobsen et al. | |
| 8,584,344 B2 | 11/2013 | Peterson | |
| 9,140,284 B2 | 9/2015 | Black | |
| 2002/0161482 A1* | 10/2002 | Dugas | B23Q 3/18 |
| | | | 700/245 |
| 2002/0164221 A1* | 11/2002 | Izutsu | G05B 19/4166 |
| | | | 409/132 |
| 2009/0302496 A1* | 12/2009 | Lukis | B29C 33/3835 |
| | | | 264/221 |
| 2013/0025162 A1* | 1/2013 | Osiol | A43B 3/0078 |
| | | | 36/103 |
| 2016/0144471 A1 | 5/2016 | Tatsuda | |
| 2016/0311022 A1 | 10/2016 | Krebs | |
| 2017/0057155 A1 | 3/2017 | Barnes | |

OTHER PUBLICATIONS

Will Adams, Workholding,website, Feb. 14, 2019 Retrieved on Apr. 19, 2017 from https://www.shapeoko.com/wiki/index.php/Workholding#Others.

* cited by examiner

600 ⇘

```
┌─────────────────────────────────────────────────────────────────────┐
│ Receiving A Graphical Representation Of A Support Structure To Be   │
│ Machined From A Body Of Material, Wherein The Graphical             │
│ Representation Of The Support Structure Includes: A First Side And  │
│ A Second Side; And A Recess Designed And Configured To Receive At   │
│ Least A Portion Of A Discrete Object                                │
│ 605                                                                 │
└─────────────────────────────────────────────────────────────────────┘
                                 ↓
┌─────────────────────────────────────────────────────────────────────┐
│ Forming in the Body of Material, Via Subtractive Manufacturing, and │
│ as a Function of the Graphical Representation of the Support        │
│ Structure, a Support Structure                                      │
│ 610                                                                 │
└─────────────────────────────────────────────────────────────────────┘
                                 ↓
┌─────────────────────────────────────────────────────────────────────┐
│ Installing the Discrete Object in the Recess to Form a Unified      │
│ Workpiece Wherein the Unified Workpiece Includes the Support        │
│ Structure and the Discrete Object                                   │
│ 615                                                                 │
└─────────────────────────────────────────────────────────────────────┘
                                 ↓
┌─────────────────────────────────────────────────────────────────────┐
│ Receiving a Machine Control Instruction Set to Produce a Machined   │
│ Article by Forming at Least a Feature in the Discrete Object        │
│ 620                                                                 │
└─────────────────────────────────────────────────────────────────────┘
                                 ↓
┌─────────────────────────────────────────────────────────────────────┐
│ Forming, Via Subtractive Manufacturing, the at Least a Feature in   │
│ the Discrete Object as a Function of the Machine Control            │
│ Instruction Set                                                     │
│ 625                                                                 │
└─────────────────────────────────────────────────────────────────────┘
                                 ↓
┌─────────────────────────────────────────────────────────────────────┐
│ Removing the Machined Article from the Support Structure            │
│ 630                                                                 │
└─────────────────────────────────────────────────────────────────────┘
```

FIG. 6

METHODS AND SYSTEMS FOR MANUFACTURING A SUPPORT STRUCTURE

RELATED APPLICATION DATA

This application claims the benefit of priority of U.S. Provisional Patent Application Ser. No. 62/479,758, filed on Mar. 31, 2017, and titled "A WORKPIECE-SPECIFIC IMMOBILIZER, AND METHODS AND SYSTEMS FOR MODELING AND MANUFACTURING A WORKPIECE-SPECIFIC IMMOBILIZER," which is incorporated by reference herein in its entirety. This application also claims the benefit of priority of U.S. Provisional Patent Application Ser. No. 62/479,740, filed on Mar. 31, 2017, and titled "A MANUFACTURING DEVICE WITH A SUPPORT STRUCTURE AND METHODS FOR MANUFACTURING A SUPPORT STRUCTURE WITH A RECESS AND A MACHINED ARTICLE," which is incorporated by reference herein in its entirety.

FIELD OF THE INVENTION

The present invention generally relates to the field of automated manufacturing. In particular, the present invention is directed to a methods and systems for manufacturing a support structure.

BACKGROUND

Automated manufacturing is flourishing to an unprecedented extent. Additive and subtractive automated methods such as three-dimensional printing and computer-guided machining are increasingly able to produce products and parts from computer design files without the need for skilled laborers to perform most of the manufacturing steps. However, all automated manufacturing processes have inherent limitations. Automated manufacturing processes cannot always produce parts to the exact specifications needed for some engineering tasks. Many such processes are also limited by the direction of application of a cutting or layer-depositing head, which may be unable to create features, whether through addition or subtraction, on "blind" sides of a workpiece.

As a result of the above limitations, many parts and products created by automated manufacturing processes require secondary processes to add details and ensure that the final product works within required tolerances. These secondary processes have proved difficult to automate despite the concerted efforts of industry, limiting the cost and time efficiency of manufacturing processes.

SUMMARY OF THE DISCLOSURE

In an aspect, a system manufacturing a support structure for use in a manufacturing process includes an automated manufacturing system. The automated manufacturing system is configured to receive a discrete object computer model of a discrete object having a first side and a second side, the discrete object computer model comprising a graphical representation of the first side and a graphical representation of the second side. The automated manufacturing system is configured to receive a computer model of a blank having a first surface and a second surface, the computer model of the blank comprising a graphical representation of the first surface and a graphical representation of the second surface. The automated manufacturing system is configured to model, as a function of the discrete object computer model, a graphical representation of a recess within the graphical representation of the first surface of the computer model of the blank.

In another aspect, a method for manufacturing a support structure for use in a manufacturing process includes receiving at an automated manufacturing system a discrete object computer model of a discrete object having a first side and a second side, the discrete object computer model comprising a graphical representation of the first side and a graphical representation of the second side. The method includes receiving at the automated manufacturing system a computer model of a blank having a first surface and a second surface, the computer model of the blank comprising a graphical representation of the first surface and a graphical representation of the second surface. The method includes modeling, at the automated manufacturing system and as a function of the discrete object computer model, a graphical representation of a recess within the graphical representation of the first surface of the computer model of the blank. The method includes generating, at the automated manufacturing system, the computer model of the support structure as a function of the graphical representation of the recess and the computer model of the blank.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 6 is an illustration of an exemplary method of manufacturing a support structure with a recess and a machined article;

DETAILED DESCRIPTION

Some aspects of the present invention are directed to a support structure that can secure a discrete object for secondary manufacturing processes. Support structure may have a surface feature that mates snugly with a portion of the workpiece, permitting the discrete object to be secured by an automated manufacturing system. Support structure may permit the automated manufacturing system to move the discrete object discrete object with precision, while holding it firmly enough to maintain a position or attitude while undergoing automated manufacturing processes. These and other aspects of the present invention are described below in connection with several exemplary embodiments. Those skilled in the art will readily appreciate that the disclosed embodiments are merely exemplary and that many other embodiments can be derived and instantiated using the broad teachings of this disclosure.

Figure 1A:
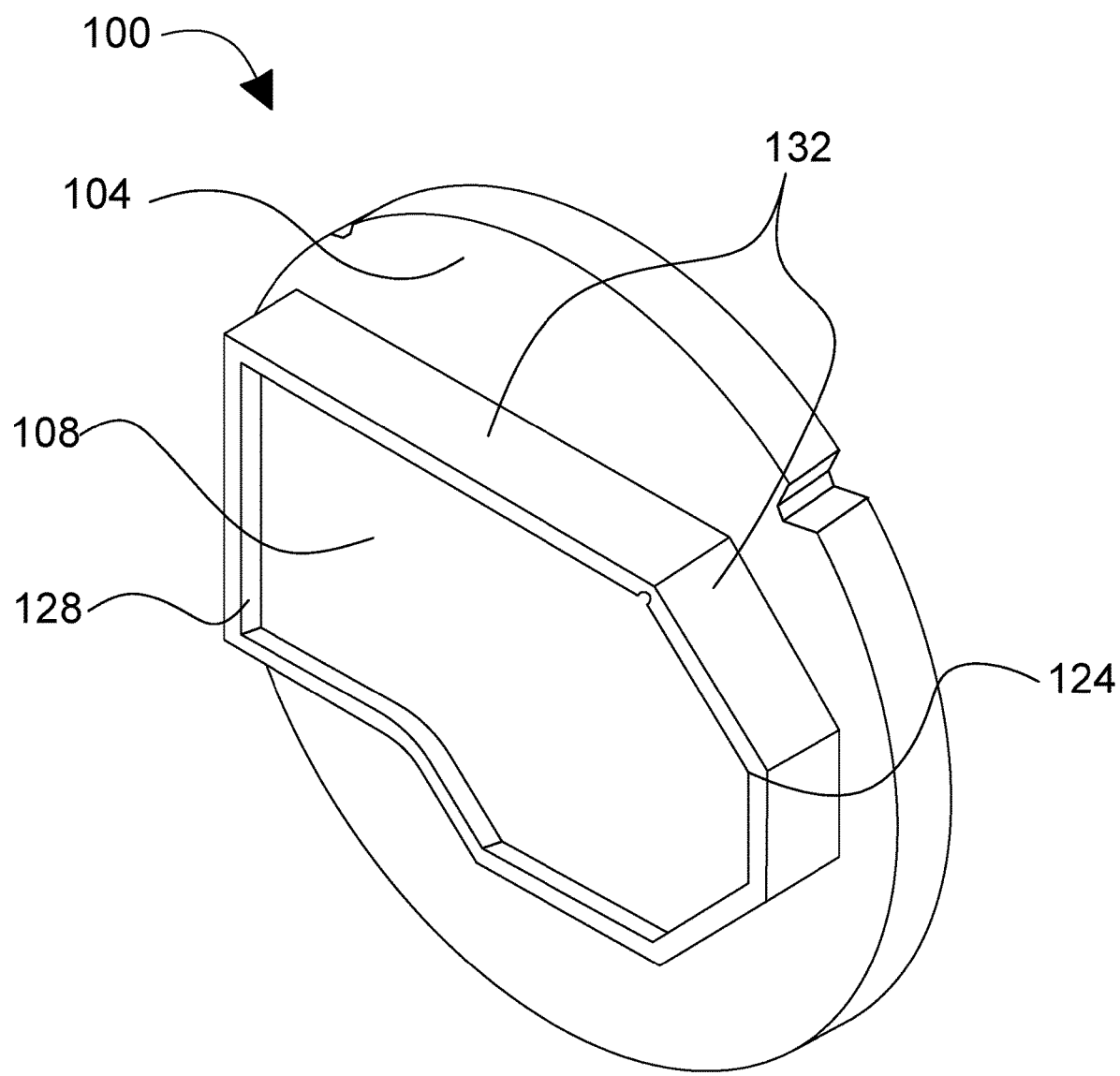
FIG. 1A is an illustration of an exemplary support structure in accordance with aspects of an embodiment.
Figure 1B:
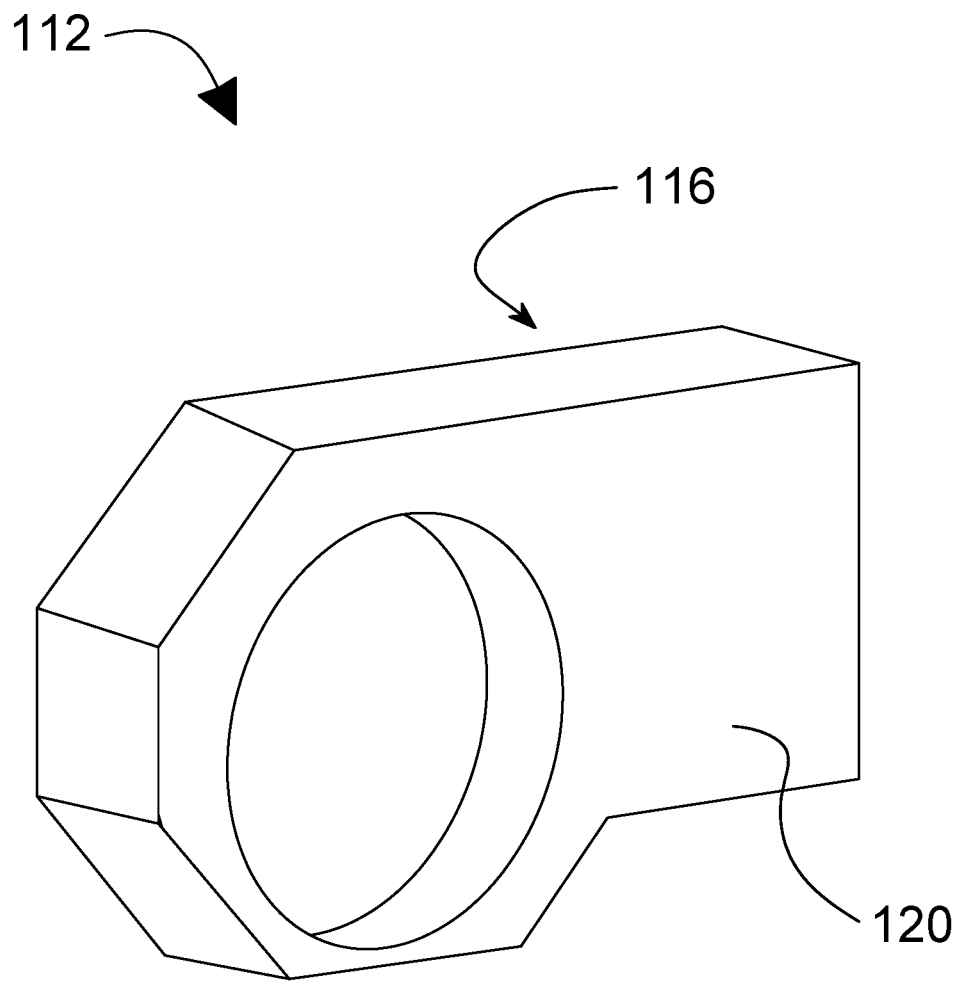
FIG. 1B is an illustration of an exemplary discrete object in accordance with aspects of an embodiment.
Figure 1C:
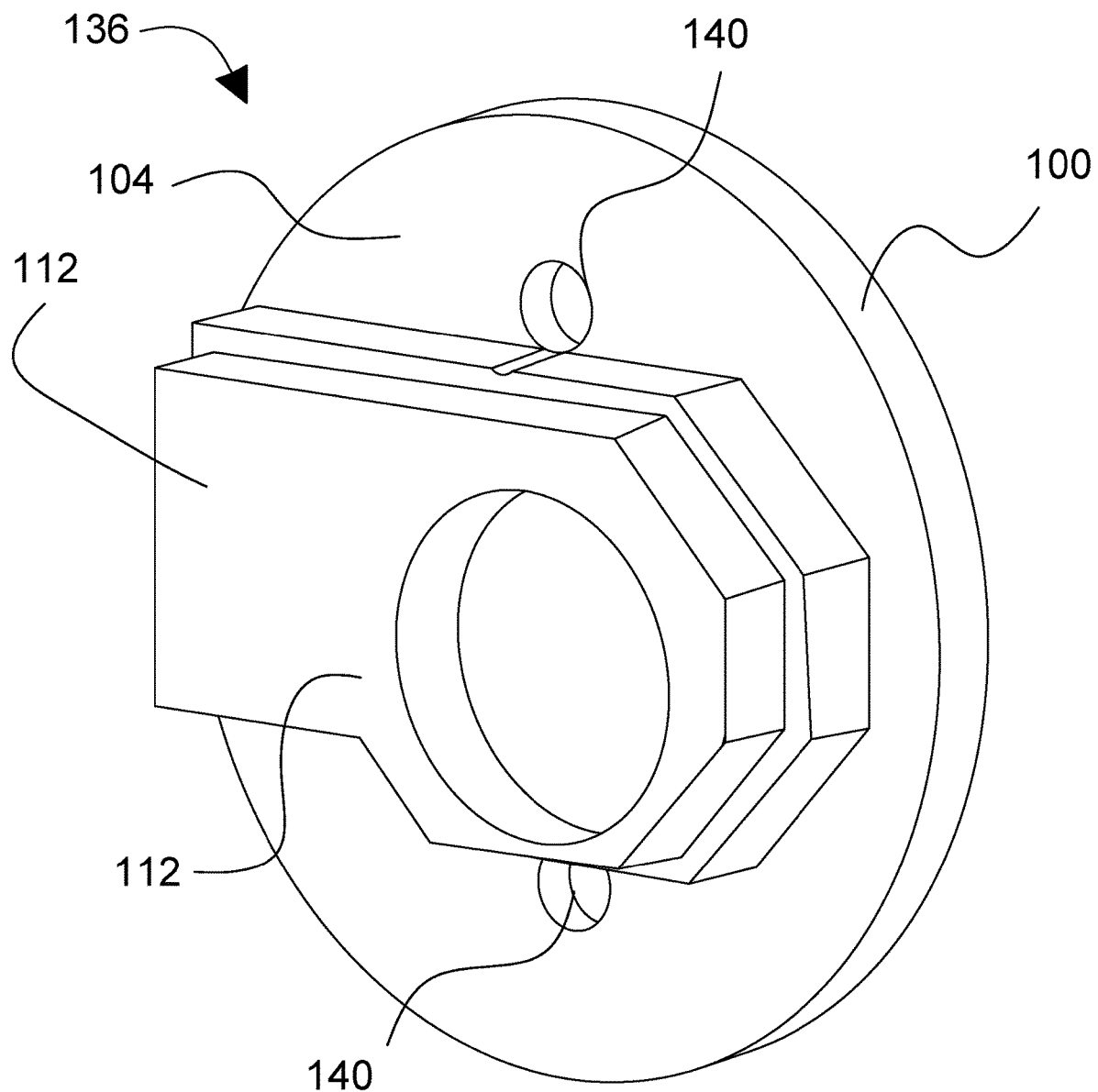
FIG. 1C is an illustration of an exemplary mated discrete object and custom fixture in accordance with aspects of an embodiment.
Figure 4:
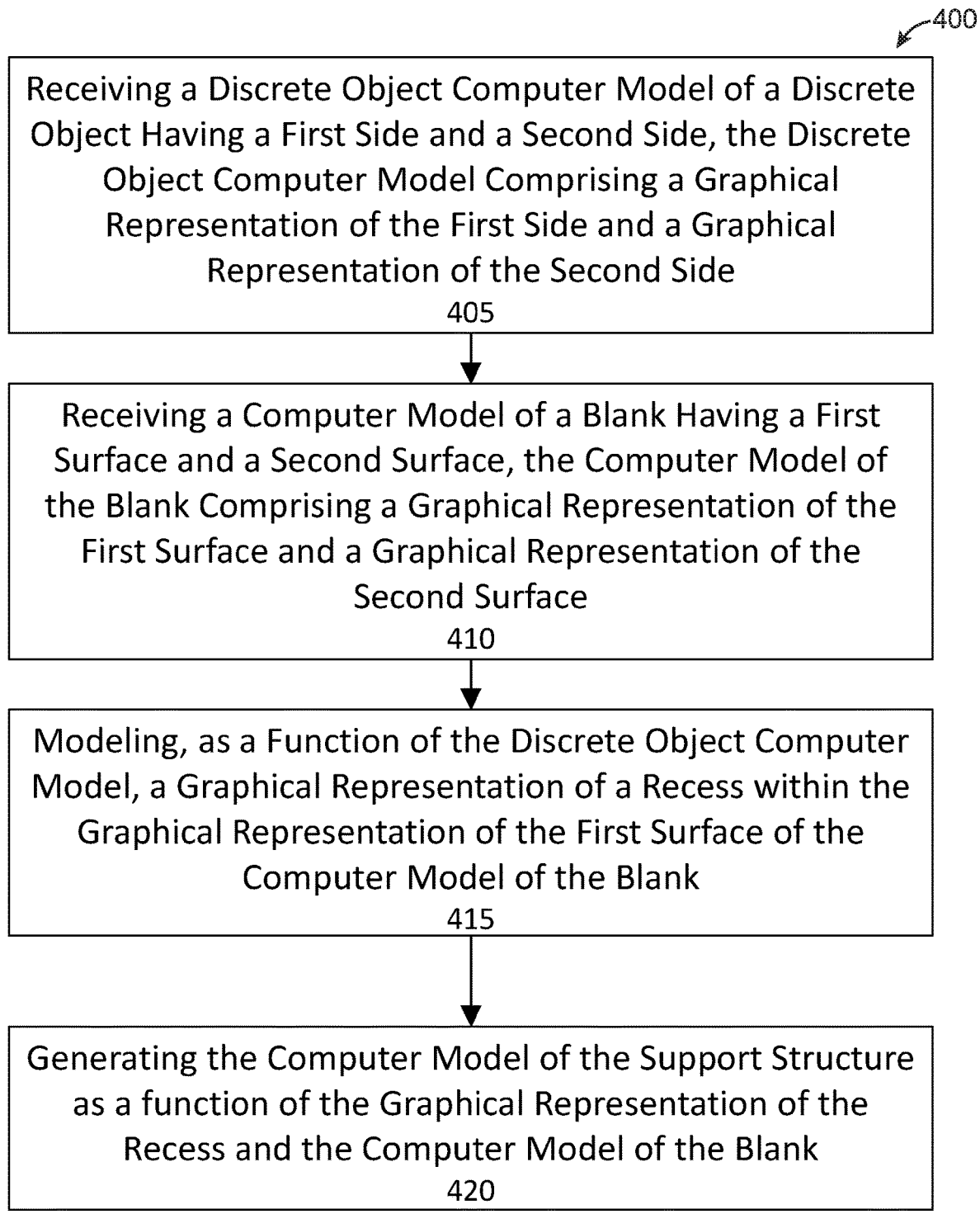
FIG. 4 is an illustration of an exemplary method of manufacturing support structure in accordance with aspects of an embodiment.
Figure 5:
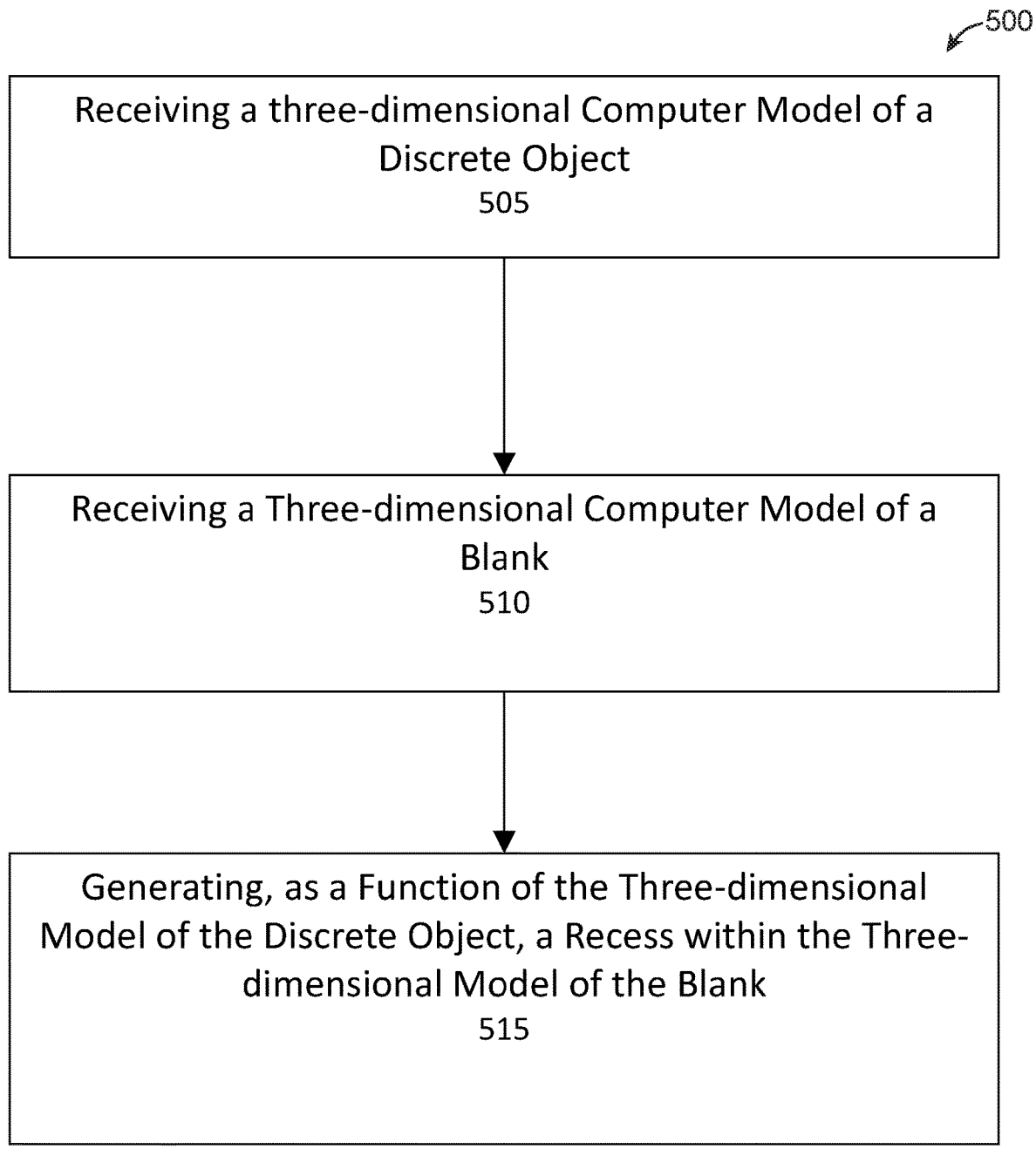
FIG. 5 is an illustration of an exemplary method of manufacturing a support structure in accordance with aspects of an embodiment.

Turning now to FIGS. 1A-C, an exemplary embodiment of a support structure 100 is illustrated. Support structure 100 includes a first side 104. Support structure includes a recess 108 in first side 104. Support structure 100 is configured to mate with a discrete object 112. Discrete object 112 has a first side 116. Recess 108 is formed to mate snugly with discrete object 112; in some embodiments, recess 108 is formed to mate snugly with first side 116. When methods described below according to FIGS. 4 and 5 are used, discrete object 112 may be transformed into a machined article. Examples of machined articles that can be manufactured using techniques disclosed herein include, but are not limited to, finished parts for assemblies (such as consumer products, military equipment, commercial equipment, among others), precursors to finished parts (such as precursors that required further processing to generate finished assembly parts), finished standalone products, and precursors to finished standalone products, among others. Generally, the only limitations on the nature and character of discrete object 112 is that it is manufactureable by one or more subtractive manufacturing processes and is compatible with other steps of processes described below. Discrete object 112 may be manufactured by subtractive machining from a larger body of material. Discrete object 112 may be formed using additive manufacturing. In some embodiments, discrete object 112 is formed using a combination of additive and subtractive methods; as a non-limiting example, discrete object 112 may be formed first by additive processes, and then subjected to one or more subtractive processes to add features to discrete object 112.

Still referring to FIGS. 1A-C, support structure 100 may be a fixture for use in a manufacturing system, such as any manufacturing system as described below in reference to FIG. 2. As used herein, an automated manufacturing system is a system that performs one or more steps in the production of a product, which may be an end-product or a part used to assemble an end-product; one or more steps in the production of a product may include any step in any method disclosed herein.

Support structure 100 may be constructed from any suitable material or combination of materials. Materials making up all or part of support structure 100 may include, without limitation, metal, which may include steel, polymer materials including plastics, carbon fiber materials, materials such as graphene, ceramic materials, mineral materials such as stone, and composite materials such as fiberglass. Support structure 100 may be produced by any automated or non-automated process, or any combination of automated or non-automated processes, including any automated manufacturing processes as described above. In some exemplary embodiments, support structure 100 is manufactured according to embodiments of methods for manufacturing a support structure 100 as described below. In other embodiments, support structure 100 is manufactured using additive manufacturing or other manufacturing methods. In some embodiments, support structure 100 is formed using a combination of additive and subtractive methods; as a non-limiting example, support structure 100 may be formed first by additive processes, and then subjected to one or more subtractive processes to add features to support structure 100.

Support structure 100 has a first side 104. First side 104 may be a side of support structure 100 to which discrete object 112 is mated as described in further detail below. Support structure 100 includes a recess 108 in first side. Recess 108 may be formed to mate with fixture side 116 of discrete object 112. In some embodiments, recess 108 is formed to fit snugly about a portion of discrete object 112, such as the portion including first side 116, so that discrete object 112 may be mated snugly to support structure 100. Recess 108 may be fit snugly about discrete object 112 if, when discrete object 112 is inserted in recess 108, recess allows essentially no freedom of movement for discrete object 112 relative to support structure 100 in any linear direction except in a direction of insertion of the discrete object 112 into the recess 108. Likewise, where recess 108 fits snugly about discrete object 112, recess 108 may allow essentially no rotational freedom of movement for discrete object 112 about any axis with respect to support structure 100 when discrete object 112 is inserted in recess 108. Recess 108 may form an interference fit with discrete object 112 when discrete object 112 is inserted in recess 108; interference fit may be a slip fit. Interference fit may be a press fit. In some embodiments, where a manufacturing device includes a securing device, discrete object 112 is held in place solely by a securing device and recess 108; as a non-limiting example, where the securing device is a tail stock, discrete object 112 may be inserted into recess, and tail stock may be advanced to apply pressure to a side 120 opposite support structure 100, securing discrete object 112 entirely. Where support structure 100 is made of rigid material such as steel or aluminum, support structure 100 and a securing device may be able to secure workpiece against strong forces such as those exerted in machining processes, while leaving a large amount of discrete object 112 surface area exposed to a manufacturing tool as described in further detail below.

In some embodiments, recess 108 matches an exterior perimeter of discrete object 112. For instance, recess may have substantially the same shape as a portion of discrete object 112 inserted therein. Recess 108 may have substantially the same dimensions as that portion of discrete object 112. Dimensions of recess 108 may differ from dimensions of the inserted portion of discrete object 112 to some tolerance, or sufficiently to accomplish a degree of fit; for instance, dimensions of recess 108 may be selected to produce a light interference fit with inserted discrete object 112. As another example, dimensions of recess 108 may be selected to form a snug slip fit with inserted discrete object 112.

Recess 108 matching an exterior perimeter of discrete object may differ in cross-sectional form from discrete object. For instance, recess 108 may include at least a cavity in an internal corner 124 of the recess, where an internal corner is a corner in an interior surface of the recess that forms an angle of less than 180 degrees. Cavity may be substantially cylindrical. In some embodiments, cavity permits an acute external angle of discrete object 112 to be accommodated in recess 108 without difficulty. Recess 108 may include a fillet on an external corner, where an external corner is a corner in an internal surface of recess 108 that forms an angle of greater than 180 degrees (i.e., projects into recess 108); fillet may serve to make insertion of at least a part of discrete object 112 into recess 108 easier given a tight fit. As a further example, recess 108 may be formed to accept a part that extends beyond the outer perimeter of the workpiece side 104; for instance, recess 108 may have an opening so that a portion of discrete object that projects beyond first side 104 in a direction parallel to first side 104 can project out of recess 108 while a portion of discrete object that fits on first side 104 remains snugly fit to recess 108. Recess 108 may have fixed dimensions; that is, recess 108 may be generated to fit at least a part of discrete object, and may not be adjustable, in contrast to a vice or clamp fixture.

In some embodiments, recess 108 includes an external perimeter surface 132 that parallels an internal perimeter surface 128 of recess 108; internal perimeter surface 128 may make up walls of recess 108. As used herein, external perimeter surface 132 parallels internal perimeter surface 128 if, for a given cross-section parallel to workpiece side 104, each point on the cross-section of the external perimeter surface 132 is the same perpendicular distance from the cross-section of internal perimeter surface as each other point. In other embodiments, external perimeter surface 132 substantially parallels internal perimeter surface 128; external perimeter surface 132 may substantially parallel internal perimeter surface 128 where external perimeter surface apparently parallels internal perimeter surface 128 with the exception of small modifications to internal perimeter surface 128 such as cavities in internal corners and fillets of external corners as described above.

FIG. 1C illustrates an exemplary embodiment of a unified workpiece 136 of discrete object 112 mated to support structure 100. Discrete object 112 is inserted into recess 108, and thus at least a part of discrete object 112 not visible in this figure. As further illustrated for exemplary purposes in FIG. 1C, support structure 100 may include at least an attachment feature 140 that secures the support structure to an automated manufacturing system. At least an attachment feature 140 may include a hole through support structure 100, such as a bolt hole or a threaded hole to admit a screw or stud; stud may include a quick-release stud as described in further detail. At least an attachment feature 140 may include a projecting element such as a bolt or stud. For instance, at least an attachment feature may include a threaded hole and a stud that is screwed into the threaded hole; at least an attachment feature may include a plurality of such holes and studs.

Support structure 100 may be formed to enable clearance for a manufacturing tool as defined below, such as without limitation an end-mill, a spindle mounted on an end-mill, or the like, to reach discrete object 112 to form one or more features thereon when discrete object 112 and support structure 100 have been combined to form unified workpiece 136. As a non-limiting example, recess 108 may be formed with a depth sufficiently shallow to expose portions and/or surfaces of discrete object 112 where one or more features are to be formed. For instance, where a manufacturing process involving unified workpiece 136 involves machining one or more sides of discrete object 112 that are accessible in a direction parallel to first side 116, such as without limitation of features to be formed on sides orthogonal to first side 116, recess 108 may be formed with a depth permitting portions of those sides to project beyond recess 108 sufficiently to enable a manufacturing tool to access those sides. Alternatively or additionally, recess 108 may be formed with a gap in interior perimeter surface 128 and/or exterior perimeter surface 132 permitting access to a manufacturing tool. As an additional possibility, exterior perimeter surface 132 may be formed to permit access to a manufacturing tool; for instance, where tool or a supporting spindle has a certain width that requires space on either side of a locus on discrete object 112 where a feature is to be formed, external perimeter surface 132 may be formed to project recess 108 and/or discrete object 112 a sufficient distance from remainder of support structure 100 to admit the width of the manufacturing tool. Alternatively or additionally, a part of the forming of recess 108, external perimeter surface 132, support structure 100, and/or a product or part to be machined from discrete object 112 may involve machining away a portion of external perimeter surface 132 and/or support structure, for instance by having a machine tool forming one or more features on discrete object 112 machine away a portion of support structure 100 occluding the feature in question; support structure may be subsequently used for additional discrete objects having a similar profile to discrete object 112. In other words, a final step of formation of support structure 100 may take place during a process of subtractively manufacturing a product or part from discrete object 112, as described in further detail below regarding manufacturing methods. Persons skilled in the art, upon reading the entirety of this disclosure, will be aware of various ways in which a support structure 100 as described herein may be formed to fulfill one or more clearance requirements of manufacturing tools to be used in manufacturing a part or product using unified workpiece 136.

Although the above description discloses a support structure 100 having a recess 108, in other embodiments custom feature includes other surface features that mate to discrete object 112. For instance, support structure 100 may include a projection (not shown) that fits snugly into a recess or cavity in discrete object 112; support structure 100 may include a plurality of such projections. Likewise, support structure 100 may include a plurality of recesses as described above, or a combination of at least a recess 108 and at least a projection. It is additionally noted that while recess 108 has been depicted for the sake of simplicity as having substantially flat and substantially orthogonal internal surfaces, recess 108 may have any form that permits recess 108 to fit snugly to discrete object 112 as described above, including without limitation curved surfaces, polyhedral surfaces, or surfaces combining curved and polyhedral forms.

Figure 2:
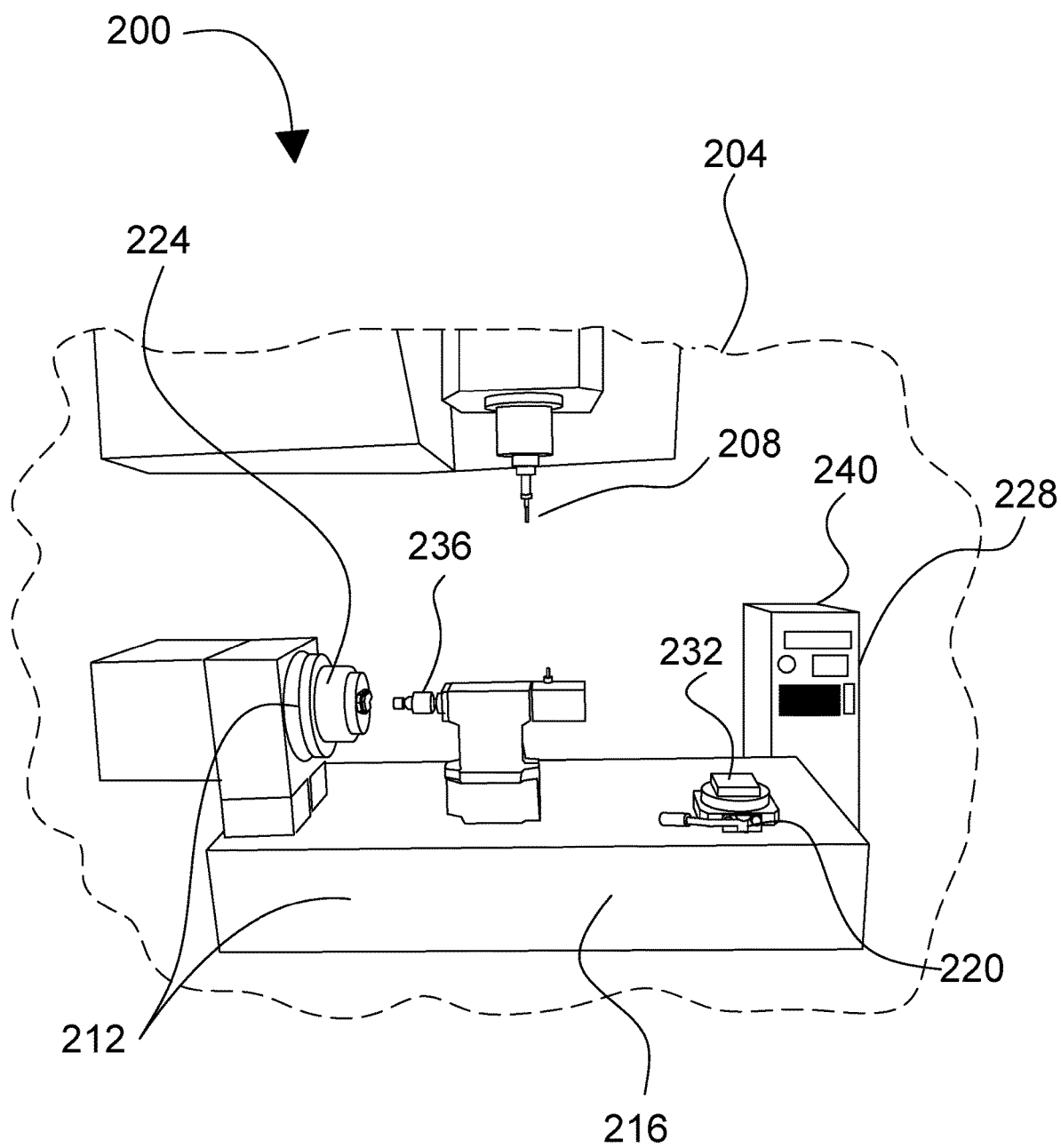
FIG. 2 is an illustration of an exemplary automated manufacturing system in accordance with aspects of an embodiment.
Figure 3A:
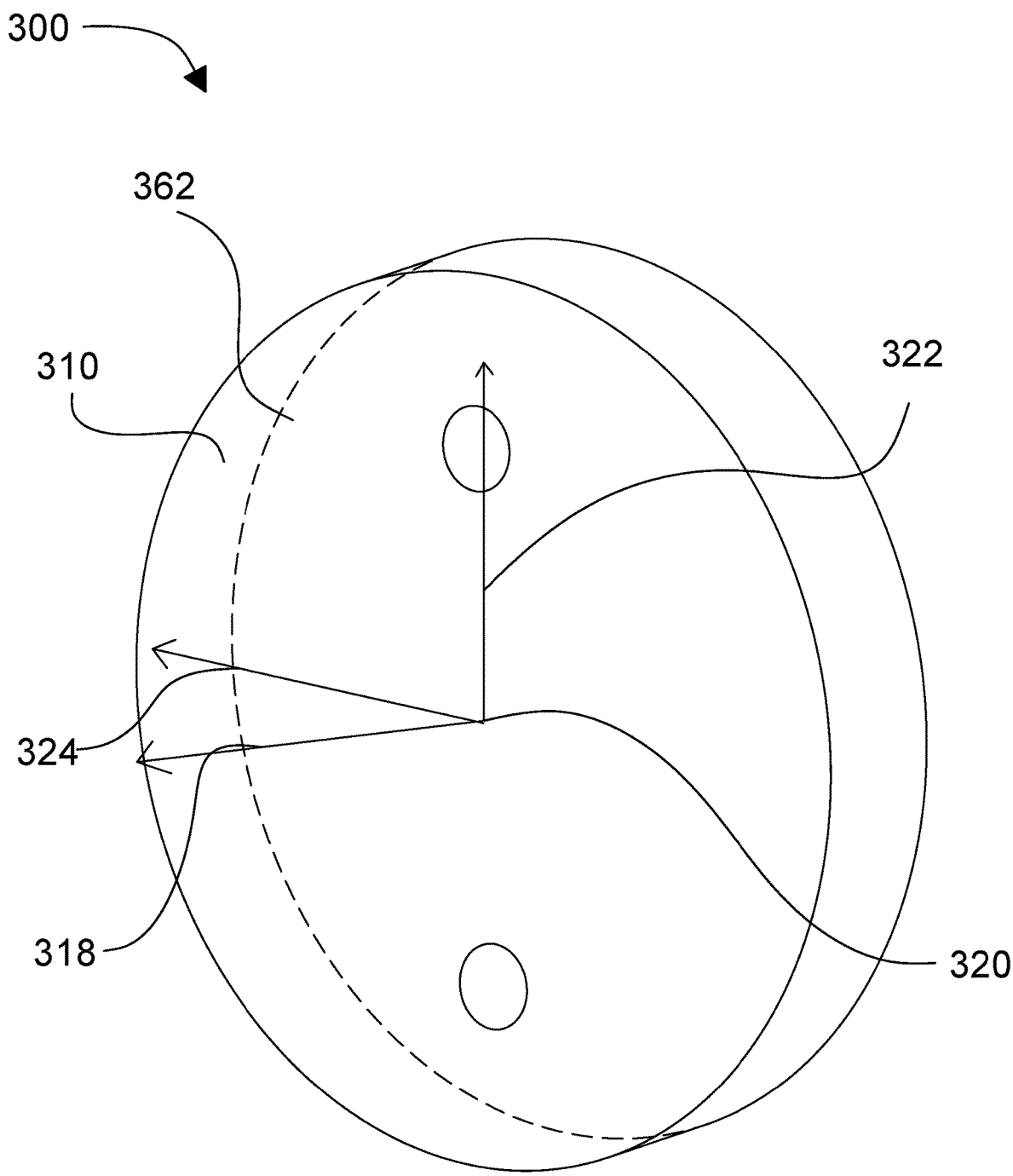
FIG. 3A is an illustration of an exemplary computer model of a blank in accordance with aspects of an embodiment.
Figure 3B:
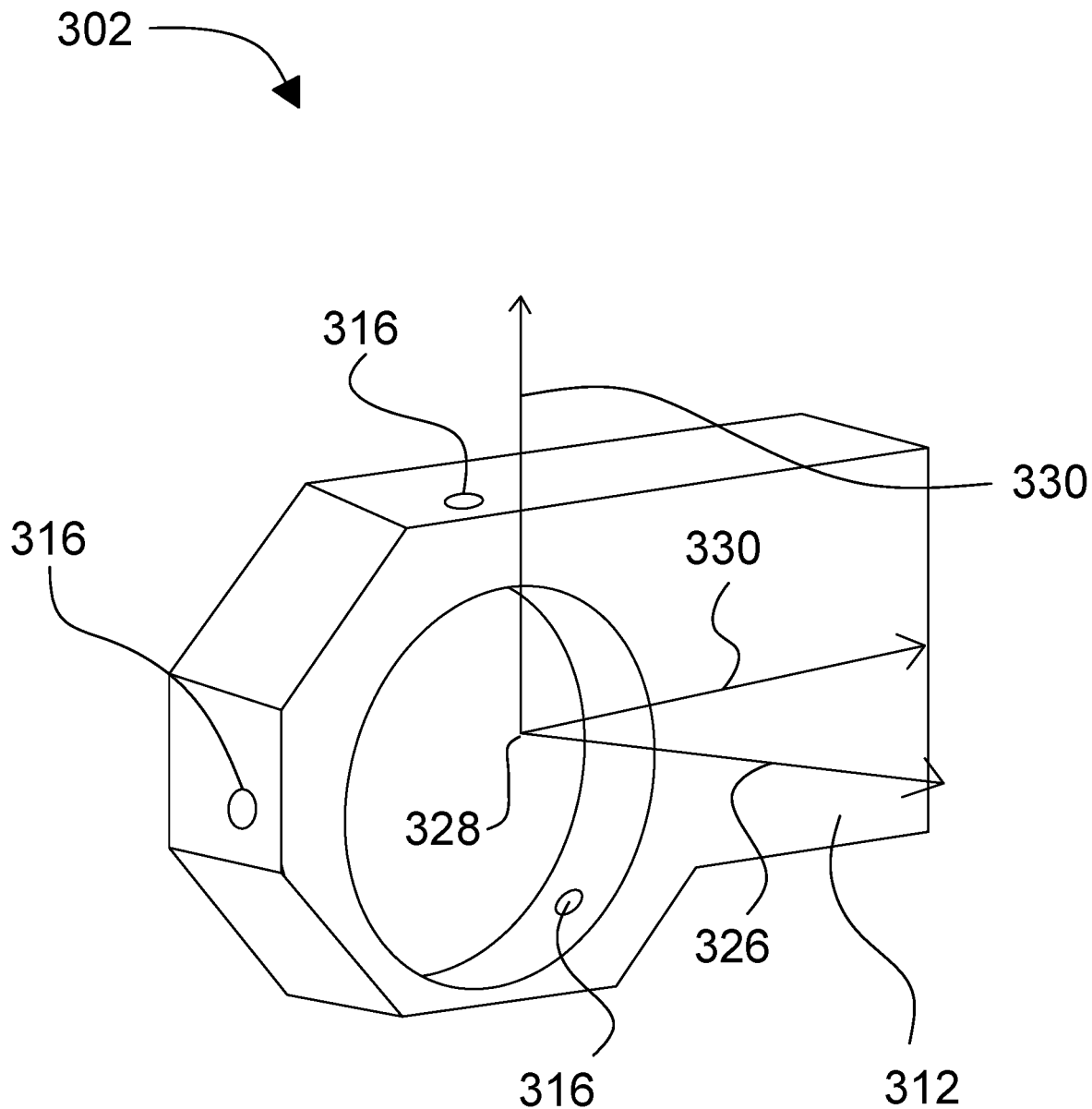
FIG. 3B is an illustration of an exemplary discrete object computer model in accordance with aspects of an embodiment.
Figure 3C:
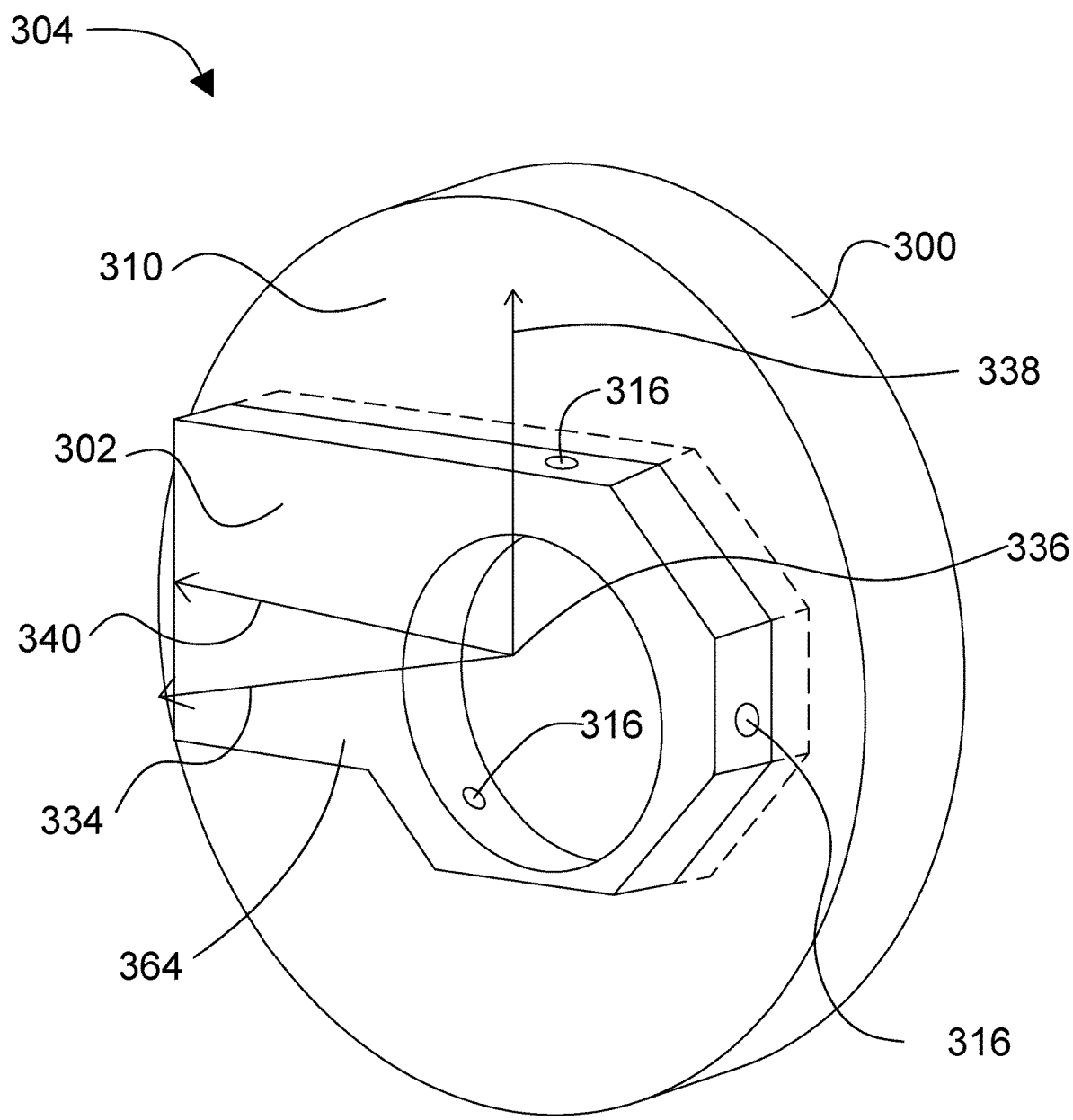
FIG. 3C is an illustration of an exemplary merged blank computer model and discrete object computer model in accordance with aspects of an embodiment.
Figure 3D:
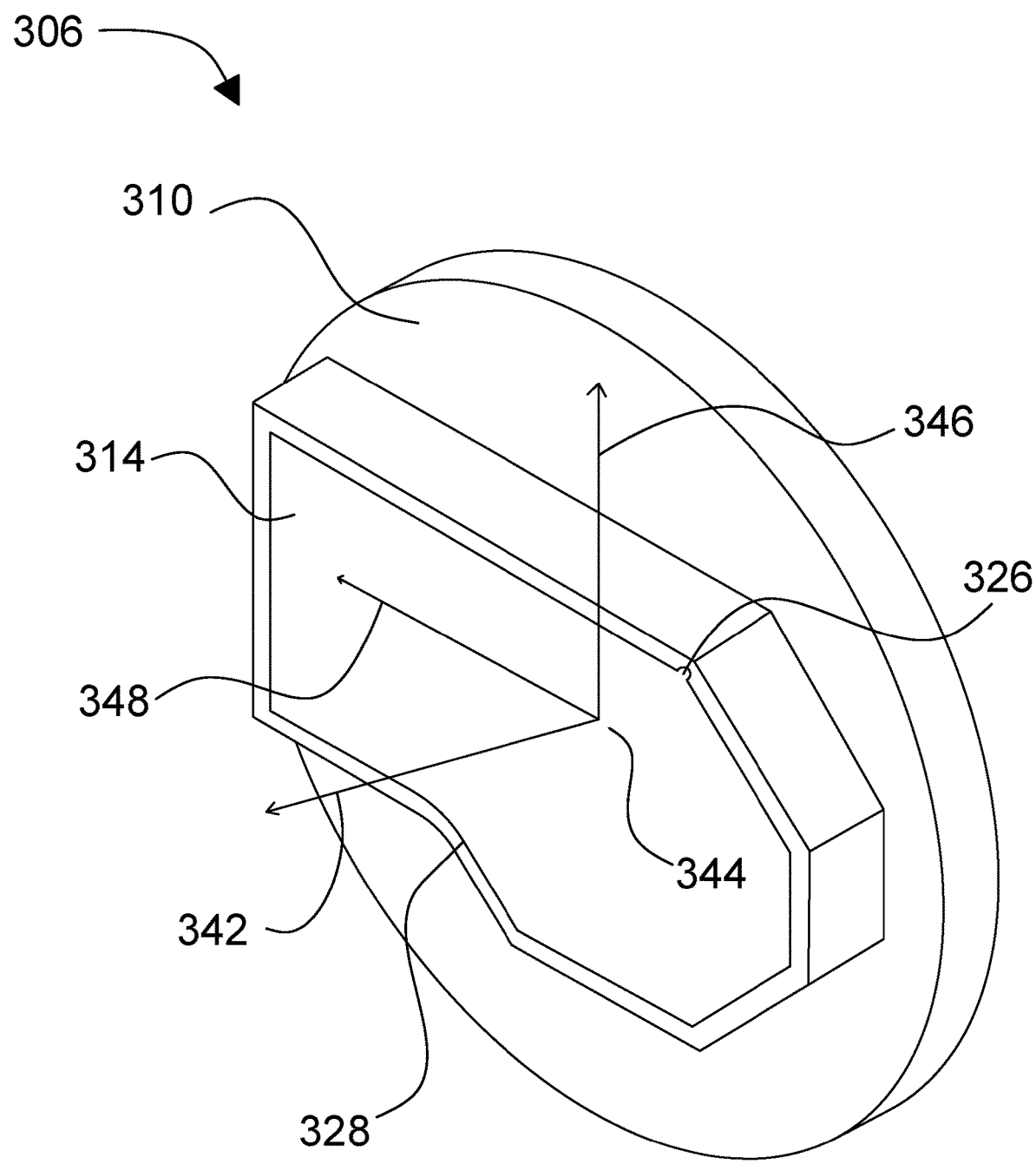
FIG. 3D is an illustration of an exemplary support structure computer model in accordance with aspects of an embodiment.
Figure 3E:
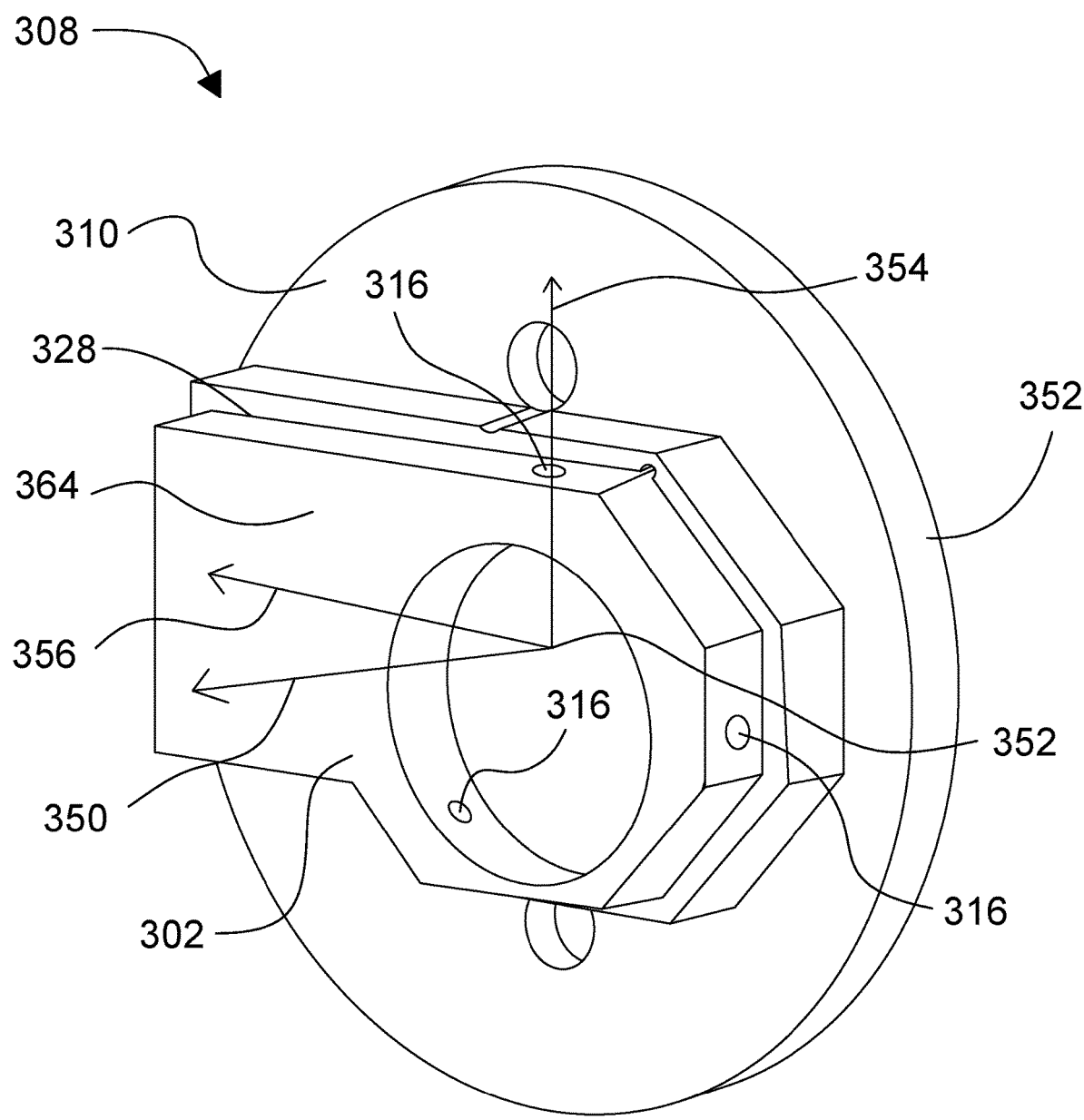
FIG. 3E is an illustration of an exemplary mated discrete object and support structure computer model in accordance with aspects of an embodiment.

Referring now to FIG. 2, an exemplary embodiment of an automated manufacturing system 200. Automated manufacturing system 200 may include a manufacturing device 204 with a support structure 100. Manufacturing device includes at least a manufacturing tool 208. Manufacturing device 204 includes at least a workpiece support 212. Manufacturing device 204 may include a support structure 100 as described herein.

In some embodiments, manufacturing device 204 is a device that may be used to form a product, which may be an end-product or a part used to assemble an end-product, by the performance of one or more manufacturing steps. As used herein, a workpiece is an object that will become a product when the one or more manufacturing steps been performed. One or more steps in the production of product may include physical modifications to workpiece or programming and modeling steps used to perform the modifications, such as modeling the workpiece or product, or computing toolpaths or other algorithms for the product's manufacture. One or more steps may include a subtractive manufacturing process, which produces the product by removing material from a workpiece; the removal of material may be accomplished using abrasives, cutting tools or endmills, laser cutting or ablation, removal using heat, or any other method that removes material from the workpiece. One or more steps may include an additive manufacturing process, in which material is deposited on the workpiece. Additive manufacturing processes may include processes that deposit successive layers of power and binder; the powder may include polymer or ceramic powder, and the binder may cause the powder to adhere, fuse, or otherwise join into a layer of material making up the workpiece or product. Likewise, additive manufacturing may be accomplished by immersion in a solution that deposits layers of material on the workpiece, by depositing and sintering materials having melting points such as metals, by applying fluid or paste-like materials in strips or sheets and then curing that material either by cooling, ultraviolet curing, and the like, any combination of the above methods, or any additional methods that involve depositing successive layers of material. One or more steps may include other steps, such as molding, extrusion, or any other processes usable to generate or modify any workpiece or product.

Manufacturing device includes at least a manufacturing tool 208; manufacturing tool 208 may be any device that modifies a workpiece to produce a product. Manufacturing tool may include an applicator or other additive device. For instance, manufacturing tool 208 may include a printer head for a 3D printer. Manufacturing tool 208 may include an extruding device for extruding fluid or paste material, a sprayer or other applicator for bonding material, an applicator for powering, a sintering device such as a laser, or other such material.

Manufacturing tool 208 may include a cutting tool. Cutting tool may be a component that removes material from workpiece. In some embodiments, cutting tool includes at least an endmill, which may be a component that removes material when rotated against workpiece. Persons skilled in the art will be aware of many variants of endmill that may be used to remove material from a workpiece. Cutting tool may include a component that transfers motion from a motor (not shown) to at least an endmill; as a non-limiting example, component may be a spindle that rotates and as a result causes endmill to rotate. Manufacturing tool 208 may include a tool changer that can switch a plurality of endmills onto and off of manufacturing tool 208; for instance, tool changer may detach an endmill currently attached to a spindle and attach a different endmill to the same spindle, enabling the automated manufacturing device to use more than one endmill in a single automated manufacturing process. Manufacturing tool 208 may include a tool changer that can switch a plurality of endmills onto and off of manufacturing tool 208.

Each subtractive manufacturing process used in connection with manufacturing device 204 or manufacturing tool 208 may be any suitable process, such as, but not limited to, rotary-tool milling, electronic discharge machining, ablation, etching, erosion, cutting, and cleaving, among others. Fundamentally, there is no limitation on the type of subtractive manufacturing process(es) used other than each is compatible with composition of the body of material and/or discrete object as described below, depending on when a particular subtractive manufacturing process is used in the overall method.

If rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others.

Manufacturing device 204 includes a workpiece support 212. Workpiece support 212 is a structure that supports a workpiece during the one or more manufacturing steps. Workpiece support 212 may include a base table 216. Base table 216 may include a surface to which a workpiece or other components may be secured. Surface may be oriented horizontally, vertically, or in any other orientation. Surface may be substantially planar. Base table 216 may include various mechanisms to attach components or workpieces to base table 216; for instance, base table 216 may include a quick release attachment mechanism 220 that can be used to attach any component having appropriate attachment features such as quick-release studs. Workpiece support 212 may include a fixture, which as used herein is a component used in a manufacturing device to secure a workpiece to the manufacturing device during the one or more manufacturing steps. A fixture may include, without limitation, one or more clamps, fasteners, vices, bolts, studs, quick-release attachment devices, straps, and chucks. A fixture may be one element of a set of fixtures; for instance, a workpiece may be secured in an automated manufacturing device 204 by a plurality of fixtures, such as a plurality of bolts.

In some embodiments, manufacturing device 204 is a mechanical manufacturing device. A mechanical manufacturing device as used herein is a manufacturing device that deprives the user of some direct control over the toolpath, defined as movements the manufacturing tool 208 and workpiece make relative to one another during the one or more manufacturing steps. For instance, manufacturing tool 208 may be constrained to move vertically, by a linear slide or similar device, so that the only decision the user may make is to raise or lower the manufacturing tool; as a non-limiting example, where manufacturing device 204 is a manually operated machine tool, user may only be able to raise and lower a cutting tool, and have no ability to move the cutting tool horizontally. Similarly, where manufacturing tool is a slide lathe, a blade on the slide lathe may be constrained to follow a particular path. As a further example, base table 216 may be moveable along one or more linear axes; for instance, base table 216 may be constrained to move along a single horizontal axis. In other embodiments, base table 216 is constrained to movement along two horizontal axes that span two dimensions, permitting freedom of movement only in a horizontal plane; for instance, base table 216 may be mounted on two mutually orthogonal linear slides.

Mechanical manufacturing device may include one or more components that have movement constrained to rotation. As a non-limiting example, a fixture of a lathe to which a workpiece is attached may be constrained to rotate about an axis, constraining the workpiece to rotate about the axis as well. As a non-limiting example, manufacturing device 204 may include a rotary table 224. Rotary table 224 may be able to rotate an object, such as a fixture or workpiece, mounted to a work surface of rotary table 224 through an axis of rotation; rotary table 224 may be able to rotate through at least 360 degrees. Objects may be attachable to rotary table 224 using quick-release studs, bolts, or other attachment mechanisms. In some embodiments, base table 216 is a rotary table. In other embodiments, rotary table 224 is mounted on base table. Rotary table 224 may have an axis of rotation parallel to surface of base table. Rotary table 224 may be able to rotate an object mounted to rotary table through an axis perpendicular to a direction of application of manufacturing tool 208. In some embodiments, this enables manufacturing tool 208 to modify a workpiece mounted to rotary table at any exposed point of the workpiece that may be rotated to face manufacturing tool 208.

Manufacturing device 204 may include a power manufacturing device. As used herein, a powered manufacturing device is a manufacturing device in which at least one component of the manufacturing device includes at least a component powered by something other than human power. At least a component may be powered by any non-human source, including without limitation electric power generated or stored by any means, heat engines including steam, internal combustion, or diesel engines, wind power, water power, pneumatic power, or hydraulic power. Powered components may include any components of manufacturing device 204. Manufacturing tool 208 may be powered; for instance, manufacturing tool 208 may include an endmill mounted on a spindle rotated by a motor (not shown). Workpiece support 212 may be powered. Where manufacturing device 204 is a mechanical device, motion of components along linear or rotary constraints may be powered; for instance, motion of base table 216 along one or more linear constraints such as linear slides may be driven by a motor or other source of power. Similarly, rotation of rotary table 224 may be driven by a power source. Tool-changer, where present, may be driven by power. In some embodiments, all or substantially all of the components of manufacturing device 204 are powered by something other than human power; for instance, all components may be powered by electrical power.

Manufacturing device 204 may include an automated manufacturing device. In some embodiments, an automated manufacturing device is a manufacturing device including a controller 228 that controls one or more manufacturing steps automatically. Controller 228 may include a sequential control device that produces a sequence of commands without feedback from other components of automated manufacturing device. Controller 228 may include a feedback control device that produces commands triggered or modified by feedback from other components. Controller 228 may perform both sequential and feedback control. In some embodiments, controller 228 includes a mechanical device. In other embodiments, controller 228 includes an electronic device. Electronic device may include digital or analog electronic components, including without limitation one or more logic circuits, such one or more logic gates, programmable elements such as field-programmable arrays, multiplexors, one or more operational amplifiers, one or more diodes, one or more transistors, one or more comparators, and one or more integrators. Electronic device may include a processor. Electronic device may include a computing device. Computing device may include any computing device as described below in reference to FIG. 6. Computing device may include a computing device embedded in manufacturing device 204; as a non-limiting example, computing device may include a microcontroller, which may be housed in a unit that combines the other components of manufacturing device 204.

Controller 228 may include a component embedded in manufacturing device 204; as a non-limiting example, controller 228 may include a microcontroller, which may be housed in a unit that combines the other components of manufacturing device 204. Further continuing the example, microcontroller may have program memory, which may enable microcontroller to load a program that directs manufacturing device 204 to perform an automated manufacturing process. Similarly, controller 228 may include any other components of a computing device as described below in reference to FIG. 6 in a device housed within manufacturing device 204. In other embodiments, controller 228 includes a computing device that is separate from the rest of the components of manufacturing device 204; for instance, controller 228 may include a personal computer, laptop, or workstation connected to the remainder of manufacturing device 204 by a wired or wireless data connection. In some embodiments, controller 228 includes both a personal computing device where a user may enter instructions to generate a program for turning workpiece into a finished product, and an embedded device that receives the program from the personal computing device and executes the program. Persons skilled in the art will be aware of various ways that a controller 228, which may include one or more computing devices, may be connected to or incorporated in an automated manufacturing device as described above.

Controller 228 may control components of automated manufacturing device; for instance, controller 228 may control elements including without limitation tool changer to switch endmills, spindle or gear systems operatively coupled to spindle to regulate spindle rotational speed, linear movement of manufacturing tool 208, base table 216, or both, and rotation or rotational position of rotary table 224. As an example, in embodiments involving subtractive manufacturing, the equipment used for removing material may be of the computerized numerical control (CNC) type that is automated and operates by precisely programmed commands that control movement of one or more parts of the equipment to effect the material removal. CNC machines, their operation, programming, and relation to computer aided manufacturing (CAM) tools and computer aided design (CAD) tools are well known and need not be described in detail herein for those skilled in the art to understand the scope of the present invention and how to practice it in any of its widely varying forms. Persons skilled in the art, upon reading the entirety of this disclosure, will be aware of similar automated control systems usable for various forms of additive manufacturing.

Manufacturing device 204 may include support structure 100. Support structure 100 may be attached to workpiece support 212; for instance, support structure 100 may be mounted to base table 216. Support structure 100 may be mounted to rotary table 224. Support structure may be attached to manufacturing device 204 using attachment features as described above in reference to FIG. 2; for instance, support structure 100 may be bolted to a component of manufacturing device 204. Support structure 100 may be attached to a component of manufacturing device 204 using at least a quick-release stud. Support structure 100 may be attached to a component of manufacturing device 204 using a quick release attachment mechanism. In some embodiments, support structure 100 is mounted to base table 216. In other embodiments, support structure 100 is mounted to rotary table 224. Support structure 100 may include a recess 108. In some embodiments, recess 108 is used to secure a discrete object 112; for instance, recess 108 may be formed to mate with a fixture side of discrete object 112 as shown above in reference to FIGS. 1A-C.

In some embodiments, as described in further detail below, manufacturing device 204 is used to manufacture support structure 100. In some embodiments, manufacturing device 204 manufactures support structure 100 by modifying a body of material 232. Body of material 232 may be any object that manufacturing device 204 modifies to manufacture support structure 100. Examples of bodies of material which may be modified to manufacture support structure 100 include, but are not limited to, plates, slabs, blooms, billets, boards, blocks, among many other shapes, including curvilinear and multisided shapes, and any combination thereof. As for the material composing the body of material 232, the material may be any suitable material, such as metal (solid, sintered, etc.), polymer (solid, foamed, etc.), wood, composite, and multilayer material, among others. Fundamentally, there is no limitation on the composition of the body of material other than it be compatible with the selected manufacturing process(es), whether subtractive or additive. Body of material 232 may be a partially machined body of material; that is, body of material 232 may be produced by performing one or more additive or subtractive manufacturing steps. As a non-limiting example, body of material 232 may be produced by subtractive machining of a larger mass or slab of material to produce a desired size and shape of a body of material 232 from which to form support structure 100. For instance, body of material 232 may be formed by subtractive machining to form a cylinder or rectangular prism of a desired height and cross-sectional area from a large slab of material. Body of material 232 may be formed using any combination of additive or subtractive manufacturing procedures.

Manufacturing device 204 may include a securing device 236 that applies pressure against a side 120 of discrete object 112 opposite support structure 100. In some embodiments, workpiece is held in place solely by securing device 236 and recess 108. Securing device 236 may be any device that applies pressure to side 120 opposite support structure 100; in some embodiments, securing device 236 occludes only the portion of workpiece against which securing device 236 applies pressure, while leaving all of the workpiece except that portion and portion inserted in recess 108 exposed for the manufacturing process. As a non-limiting example, securing device 236 may include a magnet, such as a rare-earth magnet. As another example, securing device 236 may include a tail stock. In some embodiments, a tail stock is a device having a linearly movable member with a distal end. Tailstock may include an advancement mechanism that moves linearly moveable member; advancement mechanism may be able to apply considerable force to an object in the path of linearly moveable member. Tailstock may include a bearing on distal end of linearly movable member; bearing may permit an object against which bearing is pressed by linearly moveable member to rotate freely about an axis. Axis may be substantially parallel to the path of linearly moveable member. Bearing may directly contact object; alternatively tailstock may further include a foot that contacts object and bearing, so that foot is free to rotate along with object. Foot may have any suitable form, including without limitation a wide surface area to spread pressure across object, a stopper with friction-resistant material, or a form that conforms to some extent to surface of object to ensure a tight fit.

As a further non-limiting example, manufacturing device 204 may include a machine tool having a base table 216; manufacturing tool 208 may include a cutting tool including a spindle with at least an endmill. Machine tool may include a tool changer. Base table 216 may be movable along two horizontal linear axes. Cutting tool may be movable along a third, vertical axis. Machine tool may include a rotary table 224 having an axis substantially perpendicular to the axis of movement of cutting tool; rotary table 224 may be mounted on base table 216. Support structure 100 may be mounted to rotary table, for instance using quick-release studs. Machine tool may thus be able to remove material from a discrete object 112 mated to support structure 100 from any side of discrete object that may be presented to cutting tool by rotating rotary table 224, and may be able to effect any toolpath using at least an endmill, horizontal movement of base table through two axes, vertical movement of cutting tool through a vertical axis, and rotation of rotary table 224, including without limitation through-holes, blind holes, cavities or grooves of various shapes, surface textures, reliefs, and many other forms that may be generated using machining processes.

In some embodiments, manufacturing device 204 may be useable to manufacture a product, as described in further detail below. For instance, a discrete object 112 or unified workpiece 136 may be attached to manufacturing device 204 as described below.

Automated manufacturing system 200 may include a computing device 240. Computing device 240 may include any computing device as described below in reference to FIG. 8. Computing device 240 may include a computing device embedded in automated manufacturing device; as a non-limiting example, computing device 240 may include controller 228. Computing device 240 may include any other components of a computing device as described below in reference to FIG. 8 in a device housed within automated manufacturing device 204. In other embodiments, computing device 240 includes a computing device that is separate from the manufacturing device 204; for instance, computing device 240 may include a personal computer, laptop, or workstation, including without limitation a computer system used for performing computer-aided manufacturing (CAM), including toolpath generation and the like. Computing device 240 may be connected to the remainder of automated manufacturing system 200 by a wired or wireless data connection, either directly or indirectly via a network such as the Internet. In some embodiments, computing device 240 includes both a personal computing device where a user may enter instructions to generate a program for turning discrete object into a finished product, and an embedded device that receives the program from the personal computing device and executes the program. Persons skilled in the art will be aware of various ways that one or more computing devices may be connected to or incorporated in an automated manufacturing system as described above. Computing device 240 may control components of automated manufacturing system; for instance, computing device 240 may control elements including without limitation tool changer to switch endmills, spindle or gear systems operatively coupled to spindle to regulate spindle rotational speed, linear movement of head 304, base table 216, or both, and rotational position of rotary table 224. Automated manufacturing system 200 and/or manufacturing device 204 may include one or more logic circuits that are not part of a computing device, such one or more logic gates, programmable elements such as field-programmable arrays, multiplexors, and the like.

Automated manufacturing system 200 may be configured to perform one or more steps of methods as described in further detail below. As a non-limiting example, automated manufacturing system 200 and/or a computing device 240 may be designed and/or configured to receive a discrete object computer model of a discrete object having a first side and a second side, the discrete object computer model comprising a graphical representation of the first side and a graphical representation of the second side; this step may be performed automatedly, for instance by retrieval from memory or via a network connection. Automated manufacturing system 200 and/or computing device 240 may be configured to receive a computer model of a blank having a first surface and a second surface, the computer model of the blank comprising a graphical representation of the first surface and a graphical representation of the second surface; this may be performed automatedly. Automated manufacturing system 200 and/or computing device 240 may be configured to generate a recess within the graphical representation of the first surface of the computer model of the blank as a function of the discrete object computer model. Generation of the recess may be performed automatedly. Each of the above-described processes may be performed as described below in reference to FIGS. 4-7. Automated manufacturing system 200 and/or computing device 240 may be designed or configured to perform any step of any method described below in reference to FIGS. 4-7.

In an embodiment, automate manufacturing system 200 may be configured to initiate manufacture of the support structure and/or one or more features to be formed in discrete object as a function of the recess in the computer model of the blank. Initiation of manufacture may include performance of any step disclosed below in reference to FIGS. 4-7; as non-limiting example, initiation of manufacture may include one or more machining steps to remove or add material using a manufacturing tool 208 or to move one or more elements such as base table 216, rotary table 224, linear slides bearing manufacturing tool 208, and the like. Initiation of manufacture may include transmittal of machine-control instructions to a controller 228.

In some embodiments, a computing device 240, which may or may not be connected to or incorporated in automated manufacturing system, makes use of models of the workpiece, fixture blank, custom fixture, and combined custom fixture and discrete object to perform embodiments of methods for modeling and producing support structure 100 as described in further detail below. In some embodiments, a model of an object is a representation in data, stored in a computing device or in computer-readable media, that represents at least one feature of the object that is relevant to a manufacturing process. Turning now to FIGS. 3A-E, the models may include, without limitation, a computer model 300 of the body of material 232, discrete object computer model 302, a merged computer model 304 of discrete object and fixture blank, a support structure computer model 306, and a mated computer model 308 of discrete object mated with custom fixture. Models 300-308 may be formed in computing device 240 using any suitable approach to modeling, rendering, and manipulating geometric objects in three dimensions. Each model may be generated using a design program; a design program as used herein is a program or application that enables a computing device to generate, receive, or manipulate models of workpieces, fixtures, or other objects used in automated manufacturing. As a non-limiting example, design programs may include computer-assisted design (CAD) programs. Persons skilled in the art, upon reading the entirety of this disclosure, will be aware of many programs or processes according to which a computing device may make use of models.

Features of models may represent any element or elements of support structure 100, discrete object 112, body of material 232, or any other object described above in reference to FIGS. 1A-3. Features of models used by automated manufacturing system may include without limitation a graphical representation of first surface 310 of computer model 300 of the body of material 232 or support structure computer model 306. Features may include a fixture side 312 of discrete object computer model 302. Features may include a recess 314 of support structure computer model 306. Discrete object computer model 302 may include at least a feature to form 316; at least a feature to form 316 may be a feature that automated manufacturing system forms on discrete object 112 using custom fixture. In other words, at least a feature to form 316 may not be present on discrete object prior to automated manufacturing process; thus at least a feature to form 316 may be a feature that is not currently present on discrete object 112, even though at least a feature to form 316 may be a feature of discrete object computer model 302.

Computer model 300 of the body of material 232 may include a coordinate system. Coordinate system may include first axis 318, which may be an axis of rotation 318. Axis of rotation 318 may be an axis about which object represented by model may be rotated during automated manufacturing process. For instance, where custom fixture blank is attached to rotary table 224 or similar rotating element of automated manufacturing system, axis of rotation 318 may represent an axis about which custom fixture blank will rotate when rotary table 224 rotates. Axis of rotation 318 may be selected by reference to another feature of model; for example, axis of rotation 318 may be perpendicular to a face of fixture side 312. Similarly, computer model 300 of the body of material 232 may include at least a coordinate system. At least a coordinate system may include one or more axes; in some embodiments, coordinate system includes a first axis, which may be an axis of rotation 318. Coordinate system may also include measurement along axis of rotation 318 according to a norm or standard way of calculating length between two points in a space. Coordinate system may include additional features enabling coordinate system to map points in two or three-dimensional space, including one or more additional axes or one or more angles of rotation. Coordinate system may include, without limitation, a two-dimensional Cartesian coordinate system, a three-dimensional Cartesian coordinate system, a two-dimensional polar coordinate system, or a three-dimensional spherical or cylindrical polar coordinate system. Coordinate system may have an origin point 320. For instance, origin point 320 may be located along axis of rotation and on a surface of fixture side 312 or graphical representation of first surface 310. Origin point 320 may similarly be located on a surface opposite fixture side on discrete object computer model 302 or opposite graphical representation of first surface 310 on computer model 300 of the body of material 232 or support structure computer model 306. Coordinate system may include rotational angles and/or axes to span 1, 2, or three dimensions. As a non-limiting example, in some embodiments, coordinate system includes a first axis 318, a second axis 322 perpendicular to the first axis, and a third axis 324 perpendicular both to the first axis 318 and the second axis 322. Although first axis is shown here as axis of rotation, any axis of coordinate system may be an axis of rotation. The coordinate system may also include a grid, such as a three-dimensional cubic grid. Grid may permit the location of points within the three-dimensional space occupied by computer model 300 of body of material 232; points on grid may be classified or located analogously to points in a three-dimensional coordinate system such as a three-axis Cartesian coordinate system. Grid may classify grid points according to any three-dimensional coordinate system. Grid may be any grid used in CAM or CAD systems.

Discrete object computer model 302 may also have a coordinate system which may include any feature described above for coordinate system of computer model 300 of the body of material 232, including a first axis or axis of rotation 326, an origin point, 328, a second axis 330, or a third axis 332. Coordinate system may include a grid, as described above. Merged computer model 304 may also have a coordinate system which may include any feature described above for coordinate system of computer model 300 of the body of material 232, including a first axis or axis of rotation 334, an origin point 336, a second axis 338, or a third axis 340. Coordinate system may include a grid, as described above. Support structure computer model 306 may also have a coordinate system which may include any feature described above for coordinate system of computer model 300 of the body of material 232, including a first axis or axis of rotation 342, an origin point 344, a second axis 346, or a third axis 348. Coordinate system may include a grid, as described above. Mated computer model 308 of discrete object mated with custom fixture may also have a coordinate system which may include any feature described above for coordinate system of computer model 300 of the body of material 232, including a first axis or axis of rotation 350, an origin point 352, a second axis 356, or a third axis 358. Coordinate system may include a grid, as described above.

Support structure computer model 306 may include one or more features to accommodate features of discrete object computer model 302 as described in further detail below. As an example, support structure computer model 306 may include a cavity 358 in an internal corner, as described above. Support structure computer model 306 may include a fillet 360 of an external corner as described above.

Support structure computer model 306 may also include a graphical representation of the second surface 362 of support structure 100. Likewise, discrete object computer model 302 may include a graphical representation of second side 364 of discrete object 112.

Turning now to FIG. 4, an exemplary embodiment of a method 400 of manufacturing a support structure for an automated manufacturing process is illustrated. Method 400 includes receiving, at an automated manufacturing system, a discrete object computer model of a discrete object having a first side and a second side, the discrete object computer model comprising a graphical representation of the first side and a graphical representation of the second side (405). Method 400 includes receiving, at the automated manufacturing system, a computer model of a blank having a first surface and a second surface, the computer model of the blank comprising a graphical representation of the first surface and a graphical representation of the second surface (410). Method 400 includes modeling, at the automated manufacturing system, as a function of the discrete object computer model, a graphical representation of a recess within the graphical representation of the first surface of the computer model of the blank (415). Method 400 includes generating at the automated manufacturing system, the computer model of the support structure as a function of the graphical representation of the recess and the computer model of the blank (420).

Viewing FIG. 4 in further detail, and by reference to FIGS. 1A-3E, method 400 includes receiving at a computing device a discrete object computer model of a discrete object having a first side and a second side, the discrete object computer model comprising a graphical representation of the first side and a graphical representation of the second side (405). Automated manufacturing system 200 and/or computing device 240 may include any automated manufacturing system 200 and/or computing device 240 as described above in connection with FIGS. 1A-3E.

Discrete object computer model 302 may be any discrete object computer model as described above in reference to FIGS. 3A-E. Automated manufacturing system 200 and/or computing device 240 may receive discrete object computer model 302 by forming discrete object computer model 302 on automated manufacturing system 200 and/or computing device 240. For instance, discrete object computer model 302 may be generated as part of an automated manufacturing process to produce discrete object 112; a user may have entered instructions on automated manufacturing system 200 and/or computing device 240 forming discrete object computer model 302, and automated manufacturing system 200 and/or computing device 240 may have used discrete object computer model 302 in an earlier manufacturing process to produce discrete object 112. Earlier manufacturing process may have generated one or more features of discrete object computer model 302 on discrete object 112. In some embodiments, at least a feature to form 316 is not generated in earlier manufacturing process.

In other embodiments, automated manufacturing system 200 and/or computing device 240 receives discrete object computer model 302 by forming discrete object computer model 302 to represent a discrete object 216 that already exists. For example, discrete object 216 may have been generated in any earlier manufacturing process, whether automated or not, at any point in time; discrete object computer model 302 may be formed on automated manufacturing system 200 and/or computing device 240 to represent the existing discrete object 216. The automated manufacturing system 200 and/or computing device 240 may produce discrete object computer model 302 from discrete object 216 automatically, for instance by scanning discrete object model from one or more views or using a measuring tool such as a linear displacement sensor or laser measurement tool to analyze the features and dimensions of workpiece. In other embodiments, a user enters instructions on automated manufacturing system 200 and/or computing device 240 to generate discrete object computer model 302 based on workpiece; for instance, user may generate one or more geometric primitives in a CAD program or similar program to represent one or more features of discrete object 216 as measured or otherwise detected by user. In some embodiments, the generation of discrete object model 216 combines automated and user-directed procedures.

Automated manufacturing system 200 and/or computing device 240 may receive discrete object computer model 302 from another device. Other device may be a computing device. Other device may be an automated manufacturing system as described above in reference to FIGS. 1A-3E. Automated manufacturing system 200 and/or computing device 240 may receive data representing discrete object computer model 302 by any suitable process including network communication and reception of data from storage media connected to automated manufacturing system 200 and/or computing device 240 such as flash drives, or discs.

Discrete object computer model 302 may include any feature described above in reference to FIGS. 3A-E. Discrete object computer model 302 may include at least a feature to form 316. Discrete object computer model 302 may include a graphical representation of a first side 312. Discrete object computer model 302 may include a graphical representation of a second side 364. In some embodiments, a user enters an instruction specifying graphical representation of first side 312. In other embodiments, automated manufacturing system 200 and/or computing device 240 automatically selects graphical representation of first side 312. For instance, automated manufacturing system 200 and/or computing device 240 may select fixture side based on at least a feature to form 316. As a non-limiting example, where support structure 100 is to be mounted on a rotary table 224 as described above, and head 304 or cutting tool 308 will be working orthogonally to the axis of rotation of the rotary table 224, a plurality of features to form may be most readily formed by rotating discrete object about a particular axis; in that situation, automated manufacturing system 200 and/or computing device 240 may automatically select graphical representation of first side 312 to contain a face or plane perpendicular to the axis of rotation.

In an embodiment, automated manufacturing system 200 and/or computing device 240 may detect one or more features to form 316. This may be accomplished, as a non-limiting example, by receiving one or more user instructions indicating one or more features to form. Alternatively or additionally, automated manufacturing system 200 and/or computing device 240 may detect at one or more features to form 316 by interrogating discrete object computer model 302. Interrogation, as used herein, is a process whereby a system incorporating at least a computing device, including without limitation automated manufacturing system 200 and/or computing device 240, analyzes a graphical model of a body, discrete object, part, product, workpiece, or the like, and extracts information describing one or more features represented in the graphical model, either as existing features of the body discrete object, part, product, workpiece or the like, or as features to be added to and/or formed thereon. Information extracted during interrogation may include, without limitation, geometrical information, such as lengths, widths, heights, thicknesses, contours, bend radii, opening sizes and locations, volumes, etc.; part clearances; dimensional tolerances; materials; finishes; purchased components, such as mechanical fasteners, hinges, handles, latches, etc.; and certifications. Persons skilled in the art, upon reviewing the entirety of this disclosure, will be aware of various categories of data that may likewise be extracted during interrogation. In some embodiments, model-based pricing information may be considered to be parsed into "raw" variables and "processed" variables. Raw variable are variables that an interrogator can obtain directly from the computer-model data, and processed variables are variables generated by the interrogator from raw variables. Processed variables may be thought of as inputs needed for generating a price but that are not directly available from the computer-model data. In the context of an example for machining fabrication based on a SolidWorks® computer model, raw variables may include face count, surface count, hole count, and counter-bore count, and processed variables may include cutout volume and machining operation setup count.

Interrogation may involve parsing and/or analyzing a graphical model such as a three-dimensional computer model including without limitation a CAD model to identify separate elements thereof by reading specific commands issued by or to a modeling program used to create and/or modify the graphical model. Interrogation may involve parsing and/or analyzing a graphical model to identify specific routines or functions associated with such commands to determine whether they collectively define an individual element or portion (a "shape," "solid body," or "component") of a 3D computer model. Many CAD systems, including, by way of example, SolidWorks® (registered trademark of Dassault Systemes), include an application program interface (API) to enable a user to control the issuance of customized routines or functions associated with such commands. Interrogation may involve reading such commands, routines, and functions to determine whether they define an individual shape, and, if so, may analyze various geometric aspects of the defined shape to determine whether such aspects correspond to one or more manufacturing requirements for a product to be manufactured based on a 3D computer model.

As a non-limiting example of interrogation using or based on the SolidWorks CAD program, interrogation may involve reading the "FeatureManager Design Tree" (an outline representation of individual shapes) to determine the number of solid bodies (or shapes) in the design. Representations of individual shapes may be found in other CAD software files, and other CAD software systems may be used. In SolidWorks, one command usable to analyze the number of solid bodies is:

object[ ] bodies=(object[ ])part.GetBodies2((*int*)
Const.*sw*BodyType_*e.sw*SolidBody,false);

and the output is a list of bodies. The foregoing code statement is listed by way of example only; other code statements or sequences may be used. Interrogation may involve analyzing geometric aspects of such identified shapes and comparing such aspects to corresponding manufacturing requirements. In an embodiment, these manufacturing requirements may include given starting materials. In general, interrogation may be performed using any method, facility, or combination thereof used for identifying features of a graphical model of an object, including without limitation methods or facilities used by CAD or CAM systems, for instance for toolpath generation.

In an embodiment, automated manufacturing system 200 and/or computing device 240 may identify at least a feature to be formed 316 by comparing a model of discrete object incorporating such features and/or a model of a part or product to be formed from discrete object to a model of discrete object in which such features are excluded. Interrogation may further provide a modification history of discrete object computer model 302 indicating one or more features recently added by a user or automated process.

Automated manufacturing system 200 and/or computing device 240 may select first side 116 based on detected features; for instance, interrogation may produce data indicating that one or more features to form 316 may be formed by inserting a given side of discrete object in a recess and rotating a resulting unified workpiece to render a location of each feature accessible to a machine tool, for instance on a rotary table or the like; the given side may therefore be selected as first side 116. This process may be iterative; for instance, automated manufacturing system 200 and/or computer device 240 may identify an initial first side 116, perform the remaining steps of any method disclosed herein for generation and/or manufacture of a support structure, such as support structure 100, corresponding to the initial first side, then identify a second first side 116 and repeat any and all such steps to form an additional support structure. In this way, where at least a feature to form 316 may not be formed using a single unified workpiece 136 as described above, automated manufacturing system 200 and/or computing device 240 may generate models of and/or manufacture a plurality of support structures to enable manufacture of each feature of at least a feature to form 316. First side 116 may alternatively or additionally be specified by user input. Persons skilled in the art, upon review of the entirety of this disclosure, will be aware of various techniques, APIs, facilities, and/or algorithms for automated determination of orientations for manufacture of a given feature on a given discrete object and/or determination of feasibility of formation of a given feature from a given orientation, for instance using toolpath generation programs, machine-control instruction generation programs, "slicers," and the like.

In some embodiments, discrete object computer model 302 includes a coordinate system; coordinate system may be any coordinate system as described above in reference to FIGS. 3A-E. In some embodiments, automated manufacturing system receives coordinate system with discrete object computer model 302. In other embodiments, a user enters one or more instructions on automated manufacturing system 200 and/or computing device 240 generating coordinate system. Automated manufacturing system 200 and/or computing device 240 may generate coordinate system automatedly; for instance, automated manufacturing system may generate a first axis, such as an axis of rotation, perpendicular to a face of discrete object computer model 302, such as a face of fixture side 312 or a face opposite fixture side. Automated manufacturing system 200 and/or computing device 240 may generate an origin point on a surface of discrete object computer model 302, such as a face of fixture side 312 or a face opposite fixture side; origin point may be at a geometric center of the face. Alternatively, origin point may be located interior to discrete object computer model 302. Automated manufacturing system 200 and/or computing device 240 may generate one or more additional axes. One more additional axes may be perpendicular to first axis. As a non-limiting example, automated manufacturing system 200 and/or computing device 240 may generate a three-dimensional Cartesian coordinate system for workpiece, in which a first axis is perpendicular to a face of fixture side 312 and the other two axes are perpendicular to first axis.

Method 400 includes receiving at the computing device a computer model of a blank having a first surface and a second surface, the computer model of the blank comprising a graphical representation of the first surface and a graphical representation of the second surface (410). Computer model 300 of the body of material 232 may be any computer model 300 of the body of material 232 as described above in reference to FIGS. 3A-E. Computer model 300 of the body of material 232 may be received according to any process described above for the acquisition or forming of discrete object computer model 302. Computer model 300 of the body of material 232 may have a coordinate system, which may be any coordinate system as described above in reference to FIGS. 3A-E. A user may enter one or more instructions generating coordinate system. Automatic manufacturing system 200 and/or automated manufacturing system 200 and/or computing device 240 may generate coordinate system; for instance, automatic manufacturing system may generate a first axis, such as an axis of rotation, perpendicular to a face of computer model 300 of the body of material 232, such as a face of graphical representation of first surface 310 or a face opposite graphical representation of first surface 310. Automated manufacturing system and/or automated manufacturing system 200 and/or computing device 240 may generate an origin point on a surface of computer model 300 of the body of material 232, such as a face of graphical representation of first surface 310 or a face opposite graphical representation of first surface 310; origin point may be at a geometric center of the face. Alternatively, origin point may be located interior to computer model 300 of the body of material 232. Automated manufacturing system 200 and/or computing device 240 may generate one or more additional axes. One more additional axes may be perpendicular to first axis. As a non-limiting example, automated manufacturing system 200 and/or computing device 240 may generate a three-dimensional Cartesian coordinate system for computer model 300 of the body of material 232, in which a first axis is perpendicular to a face of discrete object end 320 and the other two axes are perpendicular to first axis.

Method 400 includes modeling, as a function of the discrete object computer model, a graphical representation of a recess within the graphical representation of the first surface of the computer model of the blank (415). In some embodiments, modeling the graphical representation of the recess involves modeling the graphical representation of the recess as a function of the graphical representation of first side of the discrete object computer model. For instance, the dimensions and shape of graphical representation of the first side 312 may be reproduced as the dimensions and shape of the recess. The depth of the recess may be calculated based on a stored number representing a desired recess depth, or may be calculated as a proportion of the distance between graphical representation of the first side 312 and graphical representation of the second side 364; the distance may be computed by reference to coordinate system of discrete object computer model 302, coordinate system of the computer model of blank 300, or both coordinate systems.

Modeling the graphical representation of the recess may include shaping a recess that when formed on body of material 232 will admit the first side 116 of discrete object 112 with a slip fit, as described above in reference to FIGS. 1A-2. In some embodiments, modeling the graphical representation of the recess 314 also includes combining discrete object computer model 302 with computer model of the blank 300 to produce a merged computer model 304 wherein the graphical representation of first side 312 of discrete object is embedded between graphical representation of first surface 310 and graphical representation of the second surface 362 of computer model of the blank 300, producing an overlap region, and modeling the graphical representation of the recess to match the overlap region of the merged computer model. This may be accomplished by mapping coordinate system of discrete object computer model 312 to coordinate system of computer model of blank 300.

Automated manufacturing system 200 and/or computing device 240 may map coordinate system of discrete object computer model 312 to coordinate system of computer model of blank 300 by mapping an axis of rotation of the discrete object computer model 312 to an axis of rotation of the computer model of the blank 300. Automated manufacturing system 200 and/or computing device 240 may combine discrete object computer model 302 with computer model 300 of the body of material 232 by matching a first axis, which may be axis of rotation 326, of the discrete object computer model 302 to a first axis, which may be an axis of rotation 318, of the computer model 300 of the body of material 232. Automated manufacturing system 200 and/or computing device 240 may move discrete object computer model 302 relative to computer model 300 of the body of material 232 so that axis of rotation 326 of discrete object computer model 302 lines up with axis of rotation 318 of computer model 300 of the body of material 232. Automated manufacturing system 200 and/or computing device 240 may map coordinate system of discrete object computer model 302 to coordinate system of computer model 300 of the body of material 232 by matching a first axis, which may be axis of rotation 326, of the discrete object computer model 302 to a first axis, which may be an axis of rotation 318, of the computer model 300 of the body of material 232. Automated manufacturing system 200 and/or computing device 240 may move discrete object computer model 302 relative to computer model 300 of the body of material 232 so that axis of rotation 326 of discrete object computer model 302 lines up with axis of rotation 318 of computer model 300 of the body of material 232. Automated manufacturing system 200 and/or computing device 240 may place an origin point 328 of discrete object computer model 302 a particular distance from an origin point 320 of computer model 300 of the body of material 232; automated manufacturing system 200 and/or computing device 240 may place origin point 328 of discrete object computer model 302 coordinate system at origin point 320 of fixture blank model coordinate system. Automated manufacturing system 200 and/or computing device 240 may likewise match a second axis 330 of discrete object computer model 302 to a second axis 322 of computer model 300 of the body of material 232, or a third axis 332 of discrete object computer model 302 to a third axis 324 of computer model 300 of the body of material 232; persons skilled in the art will be aware of many ways to match one coordinate system to another, or to map one coordinate system to another, to achieve various effects.

In other embodiments, automated manufacturing system 200 and/or computing device 240 maps coordinate system of discrete object computer model 312 to coordinate system of computer model of blank 300 without generating merged computer model 304; for instance, mapping coordinate systems may be used to calculate dimensions and shape of recess based on discrete object computer model 312.

Modeling the graphical representation of the recess may include forming an inner surface of the recess to match an outer surface of the discrete object computer model. For instance, in merged model, graphical representation of first side 312 may be embedded in computer model 300 of the body of material 232; automated manufacturing system 200 and/or computing device 240 may form a new model in which all material (or digital representation of material) between a surface of graphical representation of first surface 310 and surface of portion of graphical representation of first side 312 embedded in fixture blank model is removed, generating a recess having the same dimensions and form as the embedded portion of graphical representation of first side 312; in some embodiments, all or substantially all of graphical representation of first side 312 is embedded. Automated manufacturing system 200 and/or computing device 240 may generate a recess with greater or lesser dimensions than the embedded graphical representation of first side 312, for instance to represent tolerances such as press-fit or slip-fit tolerances. In some embodiments, automated manufacturing system 200 and/or computing device 240 forms recess 314 by forming a perimeter of an opening of recess 314 to match a perimeter of discrete object computer model 302; perimeter of discrete object computer model 302 may be a line of intersection between surfaces of embedded discrete object computer model 302 and surface of computer model 300 of the body of material 232. Automated manufacturing system 200 and/or computing device 240 may also form a depth of recess 314, which together with opening may form inner surface of recess 314; depth may vary across recess 314. Sides of recess 314 from opening to depth may be substantially perpendicular to recess, or may slant inward or outward. In other embodiments, perimeter of recess 314 opening is selected to match cross-sectional perimeter of a widest cross-section of fixture side 312, for instance to accommodate a discrete object computer model 302 that flanges outward. As a further non-limiting example, where discrete object computer model 302 includes a graphical representation of a sidewall connecting graphical representation of the first side 312 to graphical representation of the second side 364, and the outer surface may include the graphical representation of the first side 312 of the discrete object and a portion of the graphical representation of the sidewall.

In some embodiments, automated manufacturing system 200 and/or computing device 240 modifies recess 314 to accommodate discrete object computer model 302. For instance, where recess 314 matches outer surface of fixture side 312, fixture side 312 may flange outward; automated manufacturing system 200 and/or computing device 240 may modify recess to match a widest cross-section of fixture side 312, so that recess 314 models a physical recess 108 into which physical first side 116 may easily be inserted. In other embodiments, automated manufacturing system 200 and/or computing device 240 forms at least a cavity 542 in an internal corner of recess 108 as shown above. Automated manufacturing system 200 and/or computing device 240 may form a fillet 360 of an external corner as shown above.

In some embodiments, automated manufacturing system 200 and/or computing device 240 forms an external perimeter that parallels an internal perimeter of recess 314 as described above in reference to FIGS. 1A-3E. Automated manufacturing system 200 and/or computing device 240 may form an external perimeter that substantially parallels internal perimeter of recess 314. In some embodiments, automated manufacturing system 200 and/or computing device 240 removes material, or the digital representation of material, from the computer model 300 of the body of material 232 outside of the external perimeter; in some embodiments, the material is removed only to a certain depth, leaving a wider base section on support structure computer model 306.

In some embodiments fixture side 312 is a first fixture side, support structure computer model 306 is a first custom fixture model and automated manufacturing system 200 and/or computing device 240 models a second custom fixture to mate to a second fixture side of discrete object computer model 302; this may be implemented as described above in reference to FIG. 4 for modeling a fixture to mate to a fixture side.

Method 400 includes generating at the automated manufacturing system, the computer model of the support structure as a function of the graphical representation of the recess and the computer model of the blank (420). Computer model of support structure may include, for instance, a support structure computer model 306 as described above. In an embodiment, automated manufacturing system and/or computing device 240 combines graphical representation of recess with computer model of blank to generate computer model of support structure; this may be accomplished by modifying geometry of computer model of blank as described above to represent the recess in the computer model of the blank. Blank as modified to include recess, with any features described above attendant to recess, may be support structure. Method 400 may include providing computer model of support structure to a user; this may be accomplished, as a non-limiting example, by displaying or printing out at least a view of computer model of support structure. Persons skilled in the art, upon reviewing the entirety of this disclosure, will be aware of various ways in which automated manufacturing system 200 may display computer model of support structure to a user, via a display of a computing device. Automated manufacturing system 200 may initiate manufacture of support structure as a function of computer model of support structure. Automated manufacturing system 200 may generate a machine-control instruction set and/or toolpath as a function of computer model of support structure, to control manufacture of support structure using a manufacturing device 204, for instance as disclosed below in reference to FIGS. 6-7.

Computer model of support structure may be generated to meet a clearance requirement for manufacturing at least a feature to form in the discrete object, which may be any feature to form 316 as described above. In an embodiment, generating to meet a clearance requirement may include generating a support structure having one or more default or standardized features formed to permit access to a typical or commonly encountered feature to form; for instance, graphical representation of recess may have a depth that is selected as a matter of default to cover some minimal portion of discrete object aside from first side. As a further example, a graphical model of an external perimeter surface may be generated or modeled so as to permit a typical machine tool, printer head, spindle, or the like to access unified workpiece sufficiently to form at least a feature to form, for instance as described above regarding unified workpiece 136. Alternatively or additionally, generation of support structure may include determining at least a clearance requirement for manufacturing at least a feature to form in the discrete object and generating the computer model of the support structure as a function of the at least a clearance requirement. In an embodiment, determining at least a clearance requirement and/or generating support structure may involve selection of first side 116 of discrete object based on detected at least a feature to form; for instance, first side 116 of discrete object may be selected to present a surface and/or portion of discrete object 112 at which at least a feature to form is to be formed in a position permitting access by a manufacturing tool to that surface and/or portion of discrete object 112. Determining at least a clearance requirement may include determining a maximal depth of recess 108 that exposes portions of discrete object 112 where features are to be formed; recess 108 may be modeled having at most that maximal depth. Determining at least a clearance requirement may include determining a minimal size or height for external perimeter surface 132 to permit a spindle, spindle shaft, or the like to access discrete object 112 sufficiently to form at least a feature to form 316; external perimeter surface 132 may be modeled to have at least that minimal size or height. Persons skilled in the art, upon reviewing the entirety of this disclosure, will be aware of various alternative or additional ways in which computer model of support structure may be generated as a function of and/or to fulfill at least a clearance requirement.

In an embodiment, the ability to automatedly generate computer model of support structure as a function of and/or to fulfill at least a clearance requirement enables a manufacturing process using support structure to be more efficient and less prone to error; where unified workpiece 136 as described above is formed by insertion of discrete object 112 into recess 108 in a support structure 100 manufactured from a computer model of support structure so formed, no human knowledge, expertise, or intervention beyond insertion is required to ensure that clearance requirements are met; as a result, a user with relatively little expertise using a particular manufacturing device may use support structure 100 as modeled above to utilize the manufacturing device in the formation of various sophisticated features in a rapid and cost-effective manner.

Although examples described above refer to the generation of support structure computer model 306 by removal of material from fixture blank model, in other embodiments automated manufacturing system 200 and/or computing device 240 generates support structure computer model 306 by adding representations of material to fixture blank model, or by a combination of addition and removal of representations of material.

Turning now to FIG. 5, exemplary embodiments of a method 500 of manufacturing a support structure for use in a manufacturing process is illustrated. Method 500 includes receiving at a computing device a three-dimensional computer model of a discrete object (505). This may be implemented as described above in connection with FIG. 4; three-dimensional computer model of discrete object may be any discrete object computer model 302 as described above in reference to FIGS. 3A-3E. Method 500 includes receiving at the computing device a three-dimensional computer model of a blank (510). This may be implemented as described above in reference to FIG. 4; three-dimensional computer model of blank may be any computer model of blank 300 as described in reference to FIGS. 3A-E. Method 500 includes generating as a function of the three-dimensional model of the workpiece, a recess within the three-dimensional model of the blank (515). This may be implemented according to any method described above in reference to FIG. 4.

In some embodiments, an automated manufacturing system a support structure computer model comprising a recess to form on a blank. Automated manufacturing system may be any automated manufacturing system as described above in reference to FIGS. 1A-3E. Support structure computer model 306 may be any custom fixture model, including without limitation a support structure computer model 306 as described above in connection with FIGS. 3A-3E. In some embodiments, automated manufacturing system receives support structure computer model 306 from another device; for example, automated manufacturing system may receive a support structure computer model 306 from a wired or wireless network connection, a direct connection to an additional computing device, or from a storage medium such as a disc or flash drive. In other embodiments, automated manufacturing system obtains support structure computer model 306 by generating support structure computer model 306; this may be implemented according to any embodiment described above in connection with FIGS. 1A-3E. A user may enter one or more instructions on automated manufacturing system to generate support structure computer model 306. Automated manufacturing system may obtain support structure computer model 306 using any combination of the above-described methods.

Automated manufacturing system may determine at least a manufacturing step to form the recess. As used herein, a manufacturing step is a physical action that an automated manufacturing system performs to convert a discrete object into a finished product. A manufacturing step may be the sole step necessary to convert the discrete object into a finished product, or may be one of several steps used to produce the finished product. As a non-limiting example, where automated manufacturing system includes a machine tool, a manufacturing step may be a cut performed with an endmill by the machine tool. In some embodiments, a user enters one or more instructions describing at least a manufacturing step on automated manufacturing system.

In other embodiments, automated manufacturing system determines at least a manufacturing step automatically, using support structure computer model 306. Automated manufacturing system may determine the at least one manufacturing step by determining a sequence of movements that automated manufacturing system may make to form a shape that makes up a part of support structure computer model 306. As a non-limiting example, where automated manufacturing system includes a machine tool, automated manufacturing system may determine dimensions and form of a shape to be cut from a computer model 300 of the body of material 232 to achieve a feature of a support structure computer model 306. Automated manufacturing system may determine a toolpath for a machine tool to follow. Sequence of movements may be computed in terms of a coordinate system of support structure computer model 306 or computer model 300 of the body of material 232; for instance, and continuing the example of an automated manufacturing system including a machine tool, sequence of movements to generate cylindrical recess having an axis of rotation matching a first axis 342 of support structure computer model 306 may include causing cutting tool 308 to descend to a point on a vertical axis 342 corresponding to the depth of the cylindrical recess, and cause the base table 216 to move according to a combination of horizontal coordinates to cause cutting tool 308 to describe a circular cross-section of cylinder. Persons skilled in the art will be aware of the many simple and complex cuts that may be performed using a machine tool with a three-dimensional coordinate system and range of motion, and that the sequence in which particular movements are taken to produce a particular cut may be varied without changing the end result. At least a manufacturing step may include other actions by automated manufacturing system including pausing to allow discrete object 112 or cutting tool 308 to cool, switching endmills using a tool changer, modifying a speed of rotation of a spindle or similar device, or returning base table 216, cutting tool 308, or other items to central or set positions.

Persons skilled in the art will be aware that where automated manufacturing system includes components other than a machine tool, such as additive manufacturing components, such components may be similarly instructed to perform additive, subtractive, or other manufacturing steps to form support structure 100.

Automated manufacturing system may perform at least a manufacturing step on the blank. Automated manufacturing system may issue one or more commands to components of automated manufacturing system to perform the at least a manufacturing step. For instance, and without limitation, automated manufacturing system may issue commands to a machine tool to perform movements according to coordinate systems used by machine tool, which may be coordinate system of support structure computer model 306 or computer model 300 of the body of material 232; commands may include any of the sequence of movements or other elements of at least a manufacturing step. Commands may be translated into electrical signals, such as modifications of voltage at a control terminal (e.g. a base or gate) of one or more transistors or at one or more inputs of one or more logic circuits; commands may be in any electrical form including pulse-width modulation, binary or other digital numerical encoding, 0-10 VDC commands, or the like. Commands may be transmitted directly from automated manufacturing system 200 and/or computing device 240 used to generate at least a manufacturing step, or from an intermediate component such as an embedded computing device or one or more control circuit elements such as operational amplifiers, comparators, logic circuits, electromagnetic transceivers, or any other device allowing one electrical circuit to communicate with another electrical circuit. Where automated manufacturing system includes components other than a machine tool, such as additive manufacturing devices, commands may be similarly issued to such components. As a non-limiting example, support structure 100 may be formed by a combination of additive and subtractive manufacturing processes, such as initial formation using additive manufacturing followed by final detailing using subtractive manufacturing.

Turning now to FIG. 6, an exemplary embodiment of a method 600 of manufacturing a support structure with a recess and a machined article is illustrated. Method 600 includes receiving a graphical representation of a support structure to be machined from a body of material, wherein the graphical representation of the support structure includes a first side and a second side and a recess designed and configured to receive at least a portion of a discrete object (605). Method 600 includes forming in body of material, via subtractive manufacturing, and as a function of graphical representation of the support structure, a support structure (610). Method 600 includes installing discrete object in the recess to form a unified workpiece wherein the unified workpiece includes the support structure and the discrete object (615). Method 600 includes receiving a machine control instruction set to produce a machined article by forming at least a feature in the discrete object (620). Method 600 includes forming, via subtractive manufacturing, at least a feature in the discrete object as a function of machine control instruction set (625). Method 600 includes removing machined article from the support structure (630).

Viewing FIG. 6 in further detail, and by reference to FIGS. 1-3C, method 600 includes receiving a graphical representation of a support structure to be machined from a body of material, wherein the graphical representation of the support structure includes a first side and a second side and a recess designed and configured to receive at least a portion of a discrete object (605). This may be performed in any suitable manner, such as using CAD and/or CAM software having a graphical user interface that allows a user to manipulate graphical representations of the discrete object and/or body of material effectively. In some embodiments, as described above, recess 132 is configured and designed to provide an interference fit with at least a portion of discrete object.

In some embodiments, a user enters instructions specifying the form of the graphical representation of the support structure 306; instructions may be entered in any suitable manner, such as using a CAD or CAM system as described above. Computing device 128 may receive graphical representation of support structure 306 from another device, by network communication, direct wired or wireless communication, or by communication with a removable memory device. In other embodiments, step 605 is performed by receiving a graphical representation of body of material 300, receiving a graphical representation of discrete object 302, and generating the graphical representation of the support structure 306 by generating the recess 314 in the graphical representation of the body of material 300 based on the graphical representation of the discrete object 302. Receiving graphical representation of discrete object 302 may be accomplished by any process for receiving graphical representation of support structure 306; graphical representation of discrete object 302 may be received as part of a process for manufacturing discrete object 136, which may be accomplished according to any manufacturing process.

In some embodiments, generating the recess involves generating the recess as a function of the graphical representation of first side of the graphical representation of discrete object 302. For instance, the dimensions and shape of graphical representation of the first side 312 may be reproduced as the dimensions and shape of the recess. The depth of the recess may be calculated based on a stored number representing a desired recess depth, or may be calculated as a proportion of the distance between graphical representation of the first side 312 and graphical representation of the second side 364; the distance may be computed by reference to coordinate system of graphical representation of discrete object 302, coordinate system of the graphical representation of body of material 300, or both coordinate systems.

Generating the recess may include shaping a recess that when formed on body of material 148 will admit the first side 208 of discrete object 136 with an interference fit, such as a slip fit, as described above in reference to FIGS. 1-3E. In some embodiments, generating the recess 314 also includes combining graphical representation of discrete object 302 with graphical representation of body of material 300 to produce a merged graphical representation 304 wherein the graphical representation of first side 312 of workpiece is embedded between graphical representation of first side 310 and graphical representation of the second side 362 of computer model of the blank 100, producing an overlap region, and generating the recess to match the overlap region of the merged computer model. This may be accomplished by mapping coordinate system of graphical representation of discrete object 302 to coordinate system of computer model of blank 100.

Controller 128 may map coordinate system of graphical representation of discrete object 302 to coordinate system of graphical representation of body of material 300 by mapping an axis of rotation of the graphical representation of discrete object 302 to an axis of rotation of the graphical representation of body of material 300. Controller 128 may combine graphical representation of discrete object 302 with graphical representation of body of material 300 by matching a first axis, which may be axis of rotation 323, of the graphical representation of discrete object 302 to a first axis, which may be an axis of rotation 318, of the graphical representation of body of material 300. Controller 128 may move graphical representation of discrete object 302 relative to graphical representation of body of material 300 so that axis of rotation 326 of graphical representation of discrete object 302 lines up with axis of rotation 318 of graphical representation of body of material 300. Controller 128 may map coordinate system of graphical representation of discrete object 302 to coordinate system of graphical representation of body of material 300 by matching a first axis, which may be axis of rotation 323, of the graphical representation of discrete object 302 to a first axis, which may be an axis of rotation 318, of the graphical representation of body of material 300. Controller 128 may move graphical representation of discrete object 302 relative to graphical representation of body of material 300 so that axis of rotation 326 of graphical representation of discrete object 302 lines up with axis of rotation 318 of graphical representation of body of material 300. Controller 128 may place an origin point 328 of graphical representation of discrete object 302 a particular distance from an origin point 320 of graphical representation of body of material 300; controller 128 may place origin point 328 of graphical representation of discrete object 302 coordinate system at origin point 320 of fixture blank model coordinate system. Controller 128 may likewise match a second axis 330 of graphical representation of discrete object 302 to a second axis 322 of graphical representation of body of material 300, or a third axis 332 of graphical representation of discrete object 302 to a third axis 324 of graphical representation of body of material 300; persons skilled in the art will be aware of many ways to match one coordinate system to another, or to map one coordinate system to another, to achieve various effects.

In other embodiments, controller 128 maps coordinate system of graphical representation of discrete object 302 to coordinate system of graphical representation of body of material 300 without generating merged graphical representation 304; for instance, mapping coordinate systems may be used to calculate dimensions and shape of recess based on graphical representation of discrete object 302.

Generating the recess may include forming an inner surface of the recess to match an outer surface of the workpiece computer model. For instance, in merged graphical representation, graphical representation of first side 312 may be embedded in graphical representation of body of material 300; controller 128 may form a new model in which all material (or digital representation of material) between a surface of graphical representation of first side 310 and surface of portion of graphical representation of first side 312 embedded in graphical representation of body of material 300 is removed, generating a recess having the same dimensions and form as the embedded portion of graphical representation of first side 312; in some embodiments, all or substantially all of graphical representation of first side 312 is embedded. Controller 128 may generate a recess with greater or lesser dimensions than the embedded graphical representation of first side 312, for instance to represent interference fit tolerances such as press-fit or slip-fit tolerances. In some embodiments, controller 128 forms recess 314 by forming a perimeter of an opening of recess 314 to match a perimeter of graphical representation of discrete object 302; perimeter of graphical representation of discrete object 302 may be a line of intersection between surfaces of embedded graphical representation of discrete object 302 and surface of graphical representation of body of material 300. Controller 128 may also form a depth of recess 314, which together with opening may form inner surface of recess 314; depth may vary across recess 314. Sides of recess 314 from opening to depth may be substantially perpendicular to recess, or may slant inward or outward. In other embodiments, perimeter of recess 314 opening is selected to match cross-sectional perimeter of a widest cross-section of fixture side 312, for instance to accommodate a graphical representation of discrete object 302 that flanges outward. As a further non-limiting example, where graphical representation of discrete object 302 includes a graphical representation of a sidewall connecting graphical representation of the first side 312 to graphical representation of the second side 364, and the outer surface may include the graphical representation of the first side 312 of the discrete object 302 and a portion of the graphical representation of the sidewall.

In some embodiments, controller 128 modifies recess 314 to accommodate graphical representation of discrete object 302. For instance, where recess 314 matches outer surface of fixture side 312, fixture side 312 may flange outward; controller 128 may modify recess to match a widest cross-section of portion of discrete object 302 to be inserted, so that recess 314 models a physical recess 108 into which physical first side 208 may easily be inserted. In other embodiments, controller 128 forms at least a cavity 358 in an internal corner of recess 108 as shown above. Controller 128 may form a fillet 360 of an external corner as shown above.

Method 600 includes forming in body of material, via subtractive manufacturing, and as a function of graphical representation of the support structure, a support structure (610). Manufacturing device may perform one or more subtractive operations to perform step 610; one or more operations may include moving body of material 148 and manufacturing tool 108 relative to each other using any means described above for moving parts of a mechanical manufacturing tool. As a non-limiting example, where body of material 148 is attached to a base table 116, base table 116 may move along two horizontal axes, controlling the horizontal form of recess 132, while the depth of recess may be controlled by vertical movements of manufacturing tool 108; manufacturing tool in some embodiments may be a cutting tool including but not limited to a spindle and endmill for a milling machine. Persons skilled in the art, upon reading the entirety of this disclosure, will be aware of many forms of subtractive manufacturing devices, each of which may perform various sequences of movements to form support structure 104.

Controller 128 may cause manufacturing device 100 to perform the sequence of steps to form support structure 104 according to a machine-control instruction set. Machine control instruction set may include a series of commands that cause elements of manufacturing device 100 to perform the sequence of movements that form support structure 104 in body of material 148. The machine-control instruction set may control the elements of manufacturing device 100 according to any suitable protocol, including but not limited to CNC protocols used where manufacturing device is a subtractive CNC machine. In some embodiments, a user enters machine-control instruction set on controller 128 or other device in communication with manufacturing device, including without limitation an additional computing device.

In other embodiments, step 610 includes automatically generating, based on graphical representation of support structure 306, machine control instruction set to form support structure 104 in body of material. A computing device included in controller 128 or in communication with manufacturing device 100 may determine at least one manufacturing step by determining a sequence of movements that manufacturing device 100 may make to form a shape that makes up a part of graphical representation of support structure 306. As a non-limiting example, where manufacturing device 100 includes a machine tool, a computing device may determine dimensions and form of a shape to be cut from graphical representation of body of material 300 to achieve a feature of a graphical representation of support structure 306. Computing device may determine a toolpath for a machine tool to follow. Machine control instructions may be computed in terms of a coordinate system of graphical representation of support structure 306 or graphical representation of body of material 300; for instance, and continuing the example of an manufacturing device 100 including a machine tool, sequence of movements to generate cylindrical recess having an axis of rotation matching a first axis 342 of graphical representation of support structure 306 may include causing cutting tool to descend to a point on a vertical axis 342 corresponding to the depth of the cylindrical recess, and cause the base table 116 to move according to a combination of horizontal coordinates to cause cutting tool to describe a circular cross-section of cylinder. Persons skilled in the art will be aware of the many simple and complex cuts that may be performed using a machine tool with a three-dimensional coordinate system and range of motion, and that the sequence in which particular movements are taken to produce a particular cut may be varied without changing the end result. Machine-control instruction set may include other actions by manufacturing device 100 including pausing to allow discrete object 136 or cutting tool to cool, switching endmills using a tool changer, modifying a speed of rotation of a spindle or similar device, or returning base table 116, cutting tool, or other items to central or set positions.

Although the above description describes forming support structure 100 by subtractive machining, the support structure may also be formed by additive manufacturing. For instance, in some embodiments manufacturing tool 108 is an additive tool such as a three-dimensional printer head, and recess 132 is formed on body of material by additive means, using body of material 148 as a substrate; body of material 148 and recess 132 may also be formed together in an additive manufacturing process. Similarly, support structure 104, body of material 148, and/or recess 132 may be formed by other manufacturing processes described above. As a non-limiting example, support structure 104 may be formed by a combination of additive and subtractive manufacturing processes, such as initial formation using additive manufacturing followed by final detailing using subtractive manufacturing.

Forming support structure 100 may include forming support structure to fulfil one or more clearance requirements as described above, including depth of recess, form of external perimeter or the like; this may be performed by reference to a graphical model of support structure generated as a function of at least a clearance requirement as described above.

Method 600 includes installing discrete object 136 in the recess 132 to form a unified workpiece wherein unified workpiece includes support structure 104 and the discrete object 136 (615). A user may install discrete object 136 in support structure 104 by inserting first side 208 of discrete object 136 into recess 132. Alternatively, an automated system such as a robotic arm or conveyor may insert discrete object 136 into recess 132. Support structure 104 may be attached to manufacturing device 100; where support structure 104 was formed in manufacturing device 100 as described above, support structure 104 may be left attached to the same portion of manufacturing device 100 as the one it was attached to during formation. Alternatively, support structure 104 may be attached to a different part of manufacturing device. As a non-limiting example, where support structure 104 was formed while attached to base table 116, support structure 104 may be moved to rotary table 124. Support structure 104 may be attached before or after discrete object 136 is inserted in recess. Support structure 104 may be attached by a user, or by automated systems as described above. Moreover, manufacturing device 100 used to form support structure 104 need not be the same manufacturing device to which unified workpiece is attached.

In some embodiments, installing discrete object 136 in recess 132 also includes clamping a side 144 of discrete object 136 opposite support structure 104. For instance, side 144 opposite support structure 104 may be a second side 144 of workpiece opposite first side 208. Clamping may be performed using securing device 140 as described above, including without limitation a tailstock.

Method 600 includes receiving a machine control instruction set to produce a machined article by forming at least a feature in discrete object (620). In some embodiments, a user enters machine control instruction set. In other embodiments, receiving machine control instruction set includes receiving a graphical representation of the machined article that includes the at least a feature; the graphical representation may be a graphical representation of discrete object 302 that includes at least a feature to form on discrete object 136 to produce machined article. In some embodiments, receiving machine control instruction set further includes generating the machine-control instruction set based on graphical representation of the machined article. For instance, a computing device, which may include controller 128, may generate machine-control instruction set based on at least a feature to form according to methods described above for the generation of machine-control instruction set to form the support structure 104.

Method 600 includes forming, via subtractive manufacturing, at least a feature in discrete object 136 as a function of machine control instruction set (625). Manufacturing device may perform one or more subtractive operations to perform step 625; one or more operations may include moving unified workpiece 228 and manufacturing tool 108 relative to each other using any means described above for moving parts of a mechanical manufacturing tool. As a non-limiting example, where unified workpiece 228 is attached to a base table 116, base table 116 may move along two horizontal axes, controlling the horizontal form of recess 132, while the depth of cuts used to form feature may be controlled by vertical movements of manufacturing tool 108; manufacturing tool in some embodiments may be a cutting tool including but not limited to a spindle and endmill for a milling machine. As a further non-limiting example where unified workpiece 228 is mounted on rotary table 124, unified workpiece 228 may be rotated to present different surfaces to cutting tool while position of cutting tool, and therefore depth of cut, may be controlled by vertical movement of cutting tool, and selection of endmills may be controlled via a tool-changer; likewise, where rotary table 124 is mounted to base table 116, step 625 may further be accomplished by movement of base table 116, and attached rotary table 124, through the horizontal plane. The above examples are provided for illustrative purposes only; persons skilled in the art, upon reading the entirety of this disclosure, will be aware of many forms of subtractive manufacturing devices, each of which may perform various sequences of movements to form support structure 104. In some embodiments, the use of support structure 104 to secure discrete object 136 in conjunction with such elements as rotary table 124 and movable base table 116 enable manufacturing device 100 to form features on discrete object 136 from various directions without any additional machine setup; this may enable, for instance, rapid and automated secondary machining of a part produced by a prior primary machining process.

As described above, forming at least a feature in discrete object may further involve removal of material from support structure 100 to access discrete object 112 to form at least a feature; where support structure 100 is reused on a subsequent discrete object 112, removal of material from support structure 100 may not be repeated. As a result, more than one toolpath or machine-control instruction set may be generated and/or used with support structure 100 for the purposes of forming at least a feature.

Although the above description describes forming machined article by subtractive machining, machined article may also be formed by additive manufacturing. For instance, in some embodiments manufacturing tool 108 is an additive tool such as a three-dimensional printer head, and machined article is formed from discrete object 136 by additive means, using discrete object as a substrate. Similarly, discrete object 136 and/or machined article may be formed by other manufacturing processes described above.

Method 600 includes removing machined article from support structure 104 (630). Removing machined article may include retiring securing device 140 from machined article; for instance, where securing device 140 is a tailstock, the tailstock may be retracted from machined article. Machined article may be pulled from recess 132. These steps may be performed by a user or by an automated system such as a robot arm or conveyor. In some embodiments, discrete object 136 is a first discrete object; such embodiments may include installing a second discrete object in the recess. Second discrete object may have substantially similar features and dimensions to first discrete object. Second discrete object may be substantially identical to first discrete object. Some embodiments of method 600 further include forming, via subtractive manufacturing, at least a feature in second discrete object as a function of the machine control instruction set. Thus, for instance, where a previous manufacturing process has produced a plurality of discrete objects having essentially identical features, support structure 104 and manufacturing device 100 with support structure attached, may be used to convert the plurality of discrete objects into a plurality of machined articles by repeatedly inserting a discrete object of the plurality of discrete objects into recess 132, executing the machine control instruction set, removing the machined article that results, and then repeating until the plurality of discrete objects is exhausted or a needed quantity of machined articles is produced. In this way, support structure 104 may rapidly convert manufacturing device 100 into a device for automatically producing machined articles in an efficient manner.

As noted above, some or all of the steps of method 600 and/or intermediate handling steps between the steps of method 600 may be automated to reduce the need for human interaction and contribution and associated costs. Such automation may be implemented using a work cell approach, wherein multiple steps are performed by one or more multitask or a set of single-task work-cell machines and one or more manipulators, as needed, to move a workpiece among the work-cell machines. Alternatively, the automation may be implemented using an assembly-line approach, wherein two or more single and/or multitask machines form an assembly line with suitable automated and/or manual conveyance means (e.g., conveyor belts, robots, dollies, push carts, etc.) for moving each workpiece from one machine to the next. Additionally, method 600 is exemplary and a person of ordinary skill in the art will, after reading this disclosure in its entirety will readily appreciate that method 600 may occur in a different order than shown here, or using a different form of manufacturing device 100 as disclosed above.

Figure 7:
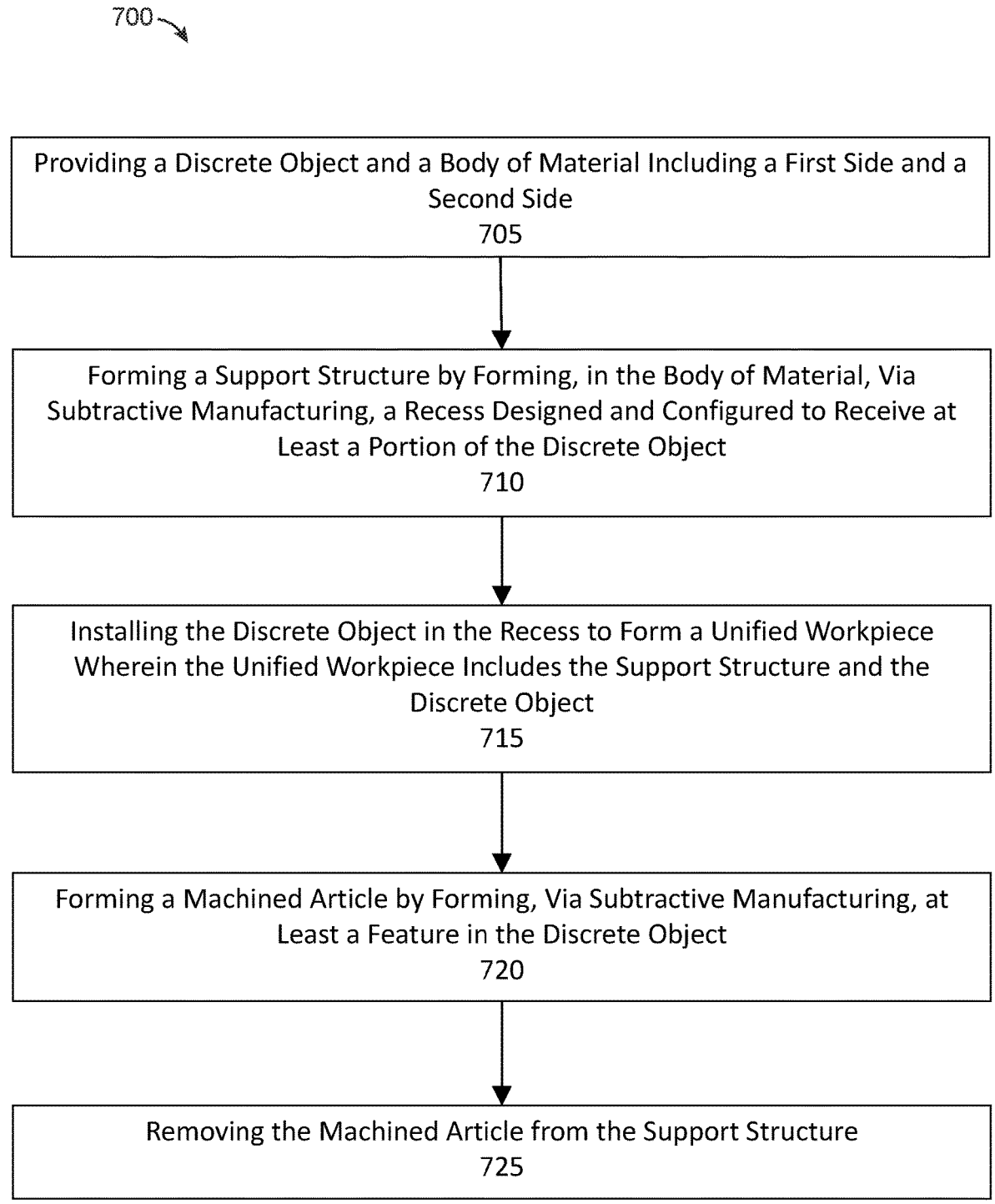
FIG. 7 is an illustration of an exemplary method of manufacturing a support structure with a recess and a machined article.

Turning now to FIG. 7, an exemplary embodiment of a method 700 of manufacturing a support structure with a recess and a machined article is illustrated. Method 700 includes providing a discrete object and a body of material including a first side and a second side (705). Method 700 includes forming a support structure by forming, in body of material, via subtractive manufacturing, a recess designed and configured to receive at least a portion of discrete object (710). Method 700 includes installing discrete object in the recess to form a unified workpiece, wherein unified workpiece includes the support structure and the discrete object (715). Method 700 includes forming a machined workpiece by forming, via subtractive manufacturing, at least a feature in discrete object (720). Method 700 includes removing machined article from support structure (725).

Viewing FIG. 7 in further detail, and by reference to FIGS. 1-3E, method 700 includes providing a discrete object and a body of material including a first side and a second side (705). Providing discrete object may include manufacturing discrete object 136 according to any manufacturing process described above. Providing discrete object 136 may involve receiving discrete object 136; for instance, discrete object 136 may be provided by a person or entity interested in converting discrete object 136 to machined article having one or more features desired by the person or entity. Discrete object 136 may be a reused product or part that may be modified to form machined article, repurposing its use.

Method 700 forming a support structure by forming, in body of material, via subtractive manufacturing, a recess designed and configured to receive at least a portion of discrete object (710). Step 710 may be performed according to any process described above for step 610; as noted above, step 710 may be performed using manufacturing processes other than subtractive manufacturing, such as additive manufacturing. In some embodiments one or more manufacturing steps to form support structure may be performed under direct or indirect control of a user; some steps may not be automated. In some embodiments, each movement of manufacturing device 100 to produce support structure 104 is controlled by a user inputting commands to a controller 128 or directly to a component of manufacturing device 100. Recess 132 may be configured and designed to provide an interference fit with at least a portion of discrete object 136.

Method 700 includes installing discrete object in the recess to form a unified workpiece, wherein the unified workpiece includes support structure and discrete object (715). This may be performed according to any process described above in reference to step 615 of method 600. Installing may include clamping a side of discrete object 136 opposite support structure 104 as described above.

Method 700 includes forming a machined workpiece by forming, via subtractive manufacturing, at least a feature in discrete object (720). Step 720 may be performed according to any process described above for steps 620-625; as noted above, step 720 may be performed using manufacturing processes other than subtractive manufacturing, such as additive manufacturing. In some embodiments one or more manufacturing steps to form machined article may be performed under direct or indirect control of a user; some steps may not be automated. In some embodiments, each movement of manufacturing device 100 to produce machined article is controlled by a user inputting commands to a controller 128 or directly to a component of manufacturing device 100.

Method 700 includes removing machined article from support structure (725). This may be performed according to any process or processes described above for step 630. In some embodiments, discrete object is a first discrete object, and method 700 further includes installing a second discrete object in recess, and forming, via subtractive manufacturing, the at least a feature in the second discrete object. As noted above, this may be repeated for a plurality of discrete objects.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
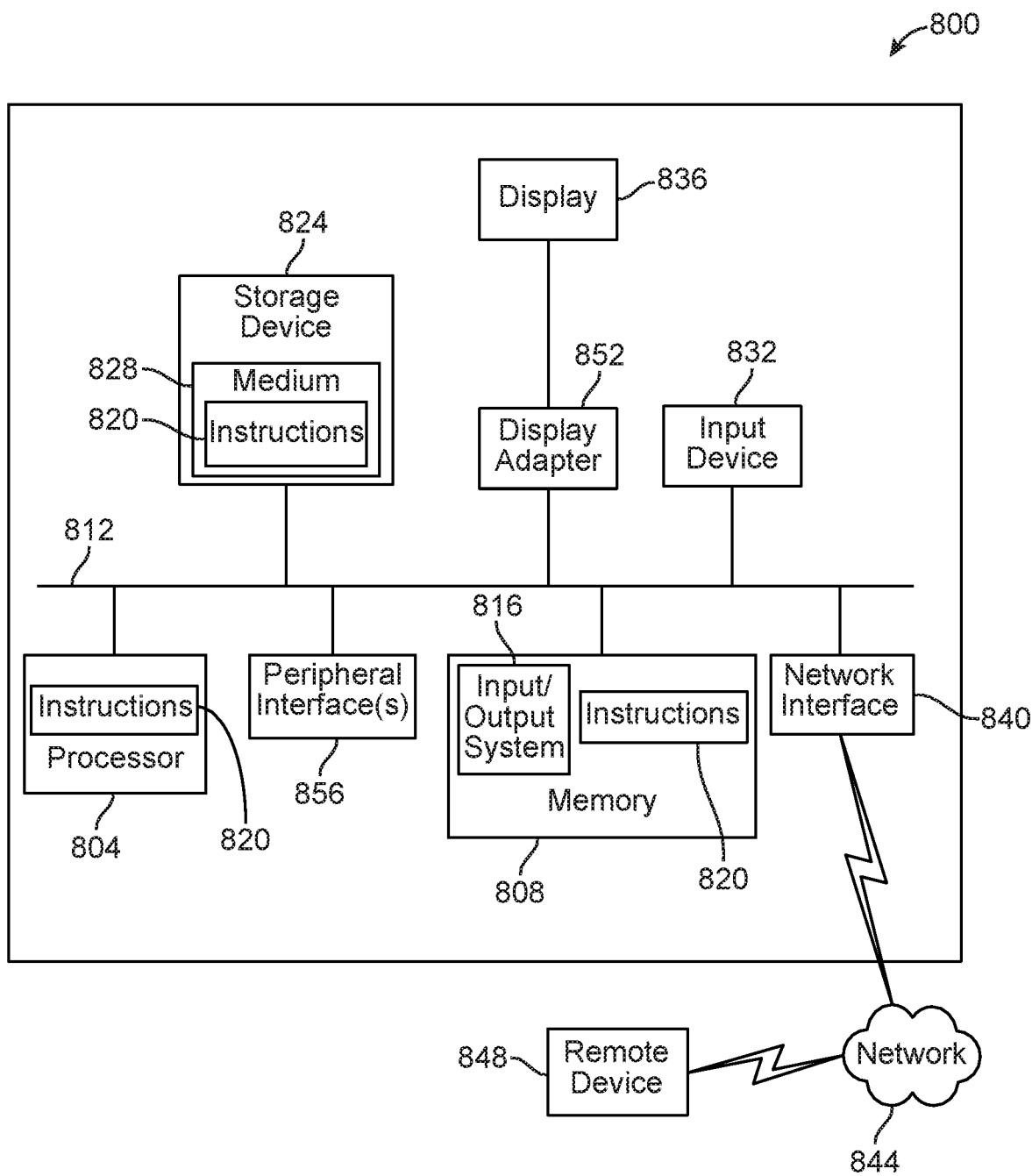
FIG. 8 is an exemplary diagrammatic representation of one embodiment of a computing device in accordance with an embodiment.

FIG. 8 shows a diagrammatic representation of one embodiment of a computing device in the exemplary form of a computer system 800 within which a set of instructions for causing a control system, such as automated manufacturing system of FIG. 3, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Memory 808 may include various components (e.g., machine-readable media) including, but not limited to, a random access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve support structure 100 and methods for its manufacture according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for manufacturing a support structure for use in a manufacturing process, the system comprising:
an automated manufacturing system, wherein the automated manufacturing system is configured to:
receive a discrete object computer model of a discrete object having a first side and a second side, the discrete object computer model comprising a graphical representation of the first side and a graphical representation of the second side;
receive a computer model of a blank having a first surface and a second surface, the computer model of the blank comprising a graphical representation of the first surface and a graphical representation of the second surface;
detect at least a feature to form in the discrete object;
determine, as a function of the at least a feature to form in the discrete object, at least a clearance requirement, wherein determining the at least a clearance requirement comprises:
selecting a side as a function of the at least a feature; and
determining a maximum depth of a recess as a function of the side;
model, as a function of the discrete object computer model and the determined clearance requirement, a graphical representation of the recess within the graphical representation of the first surface of the computer model of the blank;
generate a computer model of the support structure as a function of the computer model of the blank, the graphical representation of the recess, and the at least a clearance requirement.

2. The system of claim 1, wherein the automated manufacturing system is further configured to automatedly generate a machine-control instruction set for manufacturing the support structure as a function of the computer model of the support structure.

3. The system of claim 1, wherein the automated manufacturing system is further configured to:
combine the discrete object computer model with the computer model of the blank to produce a merged computer model wherein the graphical representation of the first side of the discrete object is embedded between the graphical representation of the first surface and the graphical representation of the second surface of the computer model of the blank, producing an overlap region; and
model the graphical representation of the recess to match the overlap region of the merged computer model.

4. The system of claim 1, the automated manufacturing system is further configured to map an axis of rotation of the discrete object computer model to an axis of rotation of the computer model of the blank.

5. The system of claim 4 wherein the automated manufacturing system is further configured to generate the axis of rotation of the discrete object computer model.

6. The system of claim 1, wherein the automated manufacturing system is further configured to map a coordinate system of the discrete object computer model to a coordinate system of the computer model of the blank.

7. The system of claim 6 wherein the automated manufacturing system is further configured to generate the coordinate system of the discrete object computer model.

8. The system of claim 1, wherein the automated manufacturing system further comprises a manufacturing device.

9. The system of claim 8, wherein the manufacturing device further comprises a subtractive manufacturing device.

10. The system of claim 1, wherein the automated manufacturing system is further configured to initiate manufacture of the support structure as a function of the computer model of the support structure.

11. A method of manufacturing a support structure for use in a manufacturing process, the method comprising:
receiving at an automated manufacturing system a discrete object computer model of a discrete object having a first side and a second side, the discrete object computer model comprising a graphical representation of the first side and a graphical representation of the second side;
receiving at the automated manufacturing system a computer model of a blank having a first surface and a second surface, the computer model of the blank comprising a graphical representation of the first surface and a graphical representation of the second surface;
detecting, at the automated manufacturing system, at least a feature to form in the discrete object;
determining, at the automated manufacturing system and as a function of the at least a feature to form in the discrete object, at least a clearance requirement, wherein determining the at least a clearance requirement comprises:
selecting a side as a function of the at least a feature; and
determining a maximum depth of a recess as a function of the side;
modeling, at the automated manufacturing system and as a function of the discrete object computer model and the determined clearance requirement, a graphical representation of the recess within the graphical representation of the first surface of the computer model of the blank; and
generating, at the automated manufacturing system, the computer model of the support structure as a function of the graphical representation of the recess, the computer model of the blank, and the at least a clearance requirement.

12. The method of claim 11, wherein the discrete object computer model further comprises at least a feature to form on the workpiece.

13. The method of claim 11, wherein modeling the graphical representation of the recess further comprises modeling the graphical representation of the recess as a function of the graphical representation of the first side of the discrete object computer model.

14. The method of claim 11, wherein modeling the graphical representation of the recess further comprises shaping a recess that when formed on the blank will admit the first side of the discrete object with a slip fit.

15. The method of claim 11, wherein generating the recess further comprises:
combining the discrete object computer model with the computer model of the blank to produce a merged computer model wherein the graphical representation of the first side of the discrete object is embedded between the graphical representation of the first surface and the graphical representation of the second surface of the computer model of the blank, producing an overlap region; and
modeling the graphical representation of the recess to match the overlap region of the merged computer model.

16. The method of claim 11, wherein generating further comprises mapping an axis of rotation of the discrete object computer model to an axis of rotation of the computer model of the blank.

17. The method of claim 16 further comprising generating, by the machining system, the axis of rotation of the discrete object computer model.

18. The method of claim 11, wherein generating further comprises mapping a coordinate system of the discrete object computer model to a coordinate system of the computer model of the blank.

19. The method of claim 18 further comprising generating, by the machining system, the coordinate system of the discrete object computer model.

20. The method of claim 11, wherein generating further comprises forming an inner surface of the recess to match an outer surface of the discrete object computer model.

21. The method of claim 11, further comprising providing the computer model of the support structure to a user.

* * * * *